United States Patent
Yoshida et al.

(10) Patent No.: US 12,449,742 B2
(45) Date of Patent: Oct. 21, 2025

(54) TONER AND METHOD FOR MANUFACTURING TONER

(71) Applicant: CANON KABUSHIKI KAISHA, Tokyo (JP)

(72) Inventors: Yu Yoshida, Shizuoka (JP); Takashi Matsui, Shizuoka (JP); Kenji Aoki, Shizuoka (JP); Tsuneyoshi Tominaga, Shizuoka (JP); Shohei Shibahara, Shizuoka (JP); Mariko Yamashita, Shizuoka (JP); Yuna Yamamoto, Tokyo (JP); Kenji Ookubo, Shizuoka (JP); Takashi Kenmoku, Tokyo (JP); Taku Shimoda, Shizuoka (JP); Masashi Kawamura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 546 days.

(21) Appl. No.: 17/502,742

(22) Filed: Oct. 15, 2021

(65) Prior Publication Data

US 2022/0128916 A1 Apr. 28, 2022

(30) Foreign Application Priority Data

Oct. 23, 2020 (JP) .................. 2020-178405

(51) Int. Cl.
G03G 9/08 (2006.01)
G03G 9/087 (2006.01)

(52) U.S. Cl.
CPC ....... *G03G 9/08755* (2013.01); *G03G 9/0806* (2013.01); *G03G 9/08728* (2013.01); *G03G 9/08731* (2013.01); *G03G 9/08795* (2013.01)

(58) Field of Classification Search
None
See application file for complete search history.

(56) References Cited

U.S. PATENT DOCUMENTS

| | | | |
|---|---|---|---|
| 4,609,607 A | 9/1986 | Takagi et al. | |
| 4,876,169 A | 10/1989 | Gruber | |
| 4,954,404 A | 9/1990 | Inoue et al. | |
| 5,104,763 A * | 4/1992 | Ong ................ | G03G 9/09328 430/110.2 |
| 5,401,601 A | 3/1995 | Sacripante | |
| 5,620,783 A | 4/1997 | Takeuchi et al. | |
| 5,639,583 A | 6/1997 | Takeuchi et al. | |
| 5,776,543 A | 7/1998 | Takeuchi et al. | |
| 6,777,153 B2 | 8/2004 | Yano et al. | |
| 6,808,907 B2 | 10/2004 | Honma et al. | |
| 6,908,721 B2 | 6/2005 | Kenmoku et al. | |
| 6,911,520 B2 | 6/2005 | Fukui et al. | |
| 7,045,321 B2 | 5/2006 | Imamura et al. | |
| 7,141,342 B2 | 11/2006 | Toyoda et al. | |
| 7,264,910 B2 | 9/2007 | Toyoda et al. | |
| 7,288,357 B2 | 10/2007 | Toyoda et al. | |
| 7,393,912 B2 | 7/2008 | Mihara et al. | |
| 7,399,568 B2 | 7/2008 | Fukui et al. | |
| 7,408,017 B2 | 8/2008 | Imamura et al. | |
| 7,452,960 B2 | 11/2008 | Yano et al. | |
| 7,510,813 B2 | 3/2009 | Yano et al. | |
| 7,638,194 B2 | 12/2009 | Fukui et al. | |
| 7,638,590 B2 | 12/2009 | Fukui et al. | |
| 7,682,765 B2 | 3/2010 | Sugawa et al. | |
| 7,795,363 B2 | 9/2010 | Fukui et al. | |
| 7,833,685 B2 | 11/2010 | Tanaka et al. | |
| 7,833,687 B2 | 11/2010 | Kato et al. | |
| 7,858,282 B2 | 12/2010 | Ayaki et al. | |
| 7,935,771 B2 | 5/2011 | Fukui et al. | |
| 8,067,136 B2 | 11/2011 | Yano et al. | |
| 8,093,342 B2 | 1/2012 | Minami et al. | |
| 8,110,329 B2 | 2/2012 | Tominaga et al. | |
| 8,178,271 B2 | 5/2012 | Fukui et al. | |
| 8,211,606 B2 | 7/2012 | Murai et al. | |
| 8,288,069 B2 | 10/2012 | Fujikawa et al. | |
| 8,323,726 B2 | 12/2012 | Naka et al. | |
| 8,372,573 B2 | 2/2013 | Ayaki et al. | |
| 8,377,616 B2 | 2/2013 | Tani et al. | |
| 8,383,312 B2 | 2/2013 | Fujimoto et al. | |
| 8,383,313 B2 | 2/2013 | Ayaki et al. | |

(Continued)

FOREIGN PATENT DOCUMENTS

CN 107367912 A 11/2017
CN 110083025 A 8/2019
(Continued)

OTHER PUBLICATIONS

JP H10213924 A Translation (Year: 2024).*
U.S. Appl. No. 17/466,306, Kenichi Nakayama, filed Sep. 3, 2021.
U.S. Appl. No. 17/502,755, Takayuki Toyoda, filed Oct. 15, 2021.
U.S. Appl. No. 17/502,771, Shohei Kototani, filed Oct. 15, 2021.
U.S. Appl. No. 17/502,876, Masashi Kawamura, filed Oct. 15, 2021.
Tadatomi Nishikubo "Addition Reaction of Epoxy Compounds with Esters and Its Application for Polymer Syntheses" Journal of Synthetic Organic Chemistry, Japan, vol. 49, No. 3, p. 218-233, 1991.

*Primary Examiner* — Peter L Vajda
*Assistant Examiner* — Charles Collins Sullivan, IV
(74) *Attorney, Agent, or Firm* — VENABLE LLP

(57) ABSTRACT

A toner comprises a toner particle comprising a resin A and a resin B, wherein the resin A has a structure represented by a predetermined general formula, and the resin B has a monomer unit represented by a predetermined general formula, and a toner manufacturing method comprises a step of dispersing a toner base particle comprising the resin B in an aqueous medium to obtain a toner slurry, and a step of adding a radical polymerization initiator and a monomer composition comprising a monomer represented by a predetermined general formula to the resulting toner slurry to form the resin A on a surface of the toner base particle.

20 Claims, No Drawings

(56) References Cited

U.S. PATENT DOCUMENTS

| | | |
|---|---|---|
| 8,551,680 B2 | 10/2013 | Ayaki et al. |
| 8,574,801 B2 | 11/2013 | Itabashi et al. |
| 8,603,712 B2 | 12/2013 | Aoki et al. |
| 8,609,312 B2 | 12/2013 | Itabashi et al. |
| 8,628,899 B2 | 1/2014 | Kawamura et al. |
| 8,652,725 B2 | 2/2014 | Watanabe et al. |
| 8,697,327 B2 | 4/2014 | Shibata et al. |
| 8,741,519 B2 | 6/2014 | Watanabe et al. |
| 8,785,101 B2 | 7/2014 | Kaya et al. |
| 8,815,484 B2 | 8/2014 | Tanaka et al. |
| 8,828,633 B2 | 9/2014 | Itabashi et al. |
| 8,846,284 B2 | 9/2014 | Kinumatsu et al. |
| 8,916,319 B2 | 12/2014 | Ikeda et al. |
| 8,940,467 B2 | 1/2015 | Hashimoto et al. |
| 8,986,914 B2 | 3/2015 | Fujikawa et al. |
| 9,029,056 B2 | 5/2015 | Kenmoku et al. |
| 9,034,549 B2 | 5/2015 | Shiotari et al. |
| 9,098,002 B2 | 8/2015 | Kenmoku et al. |
| 9,098,003 B2 | 8/2015 | Masumoto et al. |
| 9,146,485 B2 | 9/2015 | Tani et al. |
| 9,158,216 B2 | 10/2015 | Shimano et al. |
| 9,229,345 B2 | 1/2016 | Ikeda et al. |
| 9,256,148 B2 | 2/2016 | Fujikawa et al. |
| 9,261,806 B2 | 2/2016 | Moribe et al. |
| 9,285,697 B2 | 3/2016 | Fukudome et al. |
| 9,309,349 B2 | 4/2016 | Watanabe et al. |
| 9,377,705 B2 | 6/2016 | Shimano et al. |
| 9,383,668 B2 | 7/2016 | Noji et al. |
| 9,423,708 B2 | 8/2016 | Tominaga et al. |
| 9,423,714 B2 | 8/2016 | Kenmoku et al. |
| 9,429,860 B2 | 8/2016 | Kinumatsu et al. |
| 9,556,290 B2 | 1/2017 | Nishiura et al. |
| 9,575,424 B2 | 2/2017 | Nakagawa et al. |
| 9,594,323 B2 | 3/2017 | Fujikawa et al. |
| 9,599,919 B2 | 3/2017 | Isono et al. |
| 9,625,844 B2 | 4/2017 | Kaya et al. |
| 9,658,554 B2 | 5/2017 | Kinumatsu et al. |
| 9,715,187 B2 | 7/2017 | Mukumoto et al. |
| 9,720,340 B2 | 8/2017 | Tominaga et al. |
| 9,733,583 B2 | 8/2017 | Kuroki et al. |
| 9,733,584 B2 | 8/2017 | Masumoto et al. |
| 9,785,068 B2 | 10/2017 | Umeda et al. |
| 9,785,071 B2 | 10/2017 | Shimano et al. |
| 9,785,077 B2 | 10/2017 | Abe et al. |
| 9,798,256 B2 | 10/2017 | Kosaki et al. |
| 9,798,262 B2 | 10/2017 | Toyoizumi et al. |
| 9,811,016 B2 | 11/2017 | Aoki et al. |
| 9,823,595 B2 | 11/2017 | Toyoizumi et al. |
| 9,829,814 B2 | 11/2017 | Yoshida et al. |
| 9,829,816 B2 | 11/2017 | Tanaka et al. |
| 9,829,820 B2 | 11/2017 | Masumoto et al. |
| 9,835,964 B2 | 12/2017 | Yoshida et al. |
| 9,857,711 B2 | 1/2018 | Yoshida et al. |
| 9,857,713 B2 | 1/2018 | Kosaki et al. |
| 9,864,290 B2 | 1/2018 | Yamawaki et al. |
| 9,869,943 B2 | 1/2018 | Aoki et al. |
| 9,880,478 B2 | 1/2018 | Shimano et al. |
| 9,897,932 B2 | 2/2018 | Hotta et al. |
| 9,897,933 B2 | 2/2018 | Yoshida et al. |
| 9,921,501 B2 | 3/2018 | Mochizuki et al. |
| 9,964,879 B2 | 5/2018 | Terui et al. |
| 9,996,018 B2 | 6/2018 | Kubo |
| 10,012,922 B2 | 7/2018 | Yoshida et al. |
| 10,054,866 B2 | 8/2018 | Tanaka et al. |
| 10,078,285 B2 | 9/2018 | Kubo et al. |
| 10,114,303 B2 | 10/2018 | Katsura et al. |
| 10,295,920 B2 | 5/2019 | Nishikawa et al. |
| 10,295,922 B2 | 5/2019 | Terui et al. |
| 10,303,074 B2 | 5/2019 | Yamawaki et al. |
| 10,303,075 B2 | 5/2019 | Tanaka et al. |
| 10,409,180 B2 | 9/2019 | Koji et al. |
| 10,416,582 B2 | 9/2019 | Nakagawa et al. |
| 10,429,757 B2 | 10/2019 | Yoshida et al. |
| 10,437,165 B2 | 10/2019 | Shimano et al. |
| 10,459,360 B2 | 10/2019 | Suzuki et al. |
| 10,503,090 B2 | 12/2019 | Tominaga et al. |
| 10,545,420 B2 | 1/2020 | Kinumatsu et al. |
| 10,545,422 B2 | 1/2020 | Yamawaki et al. |
| 10,551,758 B2 | 2/2020 | Tanaka et al. |
| 10,564,560 B2 | 2/2020 | Onozaki |
| 10,578,990 B2 | 3/2020 | Tsuda et al. |
| 10,635,010 B2 | 4/2020 | Kamikura et al. |
| 10,635,011 B2 | 4/2020 | Umeda et al. |
| 10,678,155 B2 | 6/2020 | Terui et al. |
| 10,732,530 B2 | 8/2020 | Matsui et al. |
| 10,747,133 B2 | 8/2020 | Yagi et al. |
| 10,747,136 B2 | 8/2020 | Kenmoku et al. |
| 10,782,623 B2 | 9/2020 | Yoshiba et al. |
| 10,845,721 B2 | 11/2020 | Tanaka et al. |
| 10,877,388 B2 | 12/2020 | Aoki et al. |
| 10,877,389 B2 | 12/2020 | Kamikura et al. |
| 10,877,390 B2 | 12/2020 | Shimano et al. |
| 10,942,465 B2 | 3/2021 | Kotutani et al. |
| 10,942,466 B2 | 3/2021 | Tominaga et al. |
| 10,976,678 B2 | 4/2021 | Yamawaki et al. |
| 10,976,679 B2 | 4/2021 | Tanaka et al. |
| 11,003,104 B2 | 5/2021 | Katsura et al. |
| 11,003,105 B2 | 5/2021 | Sato et al. |
| 11,112,708 B2 | 9/2021 | Uratani et al. |
| 11,169,458 B2 | 11/2021 | Toyoizumi et al. |
| 11,169,460 B2 | 11/2021 | Kotutani et al. |
| 11,175,600 B2 | 11/2021 | Uchiyama et al. |
| 11,181,839 B2 | 11/2021 | Yamashita et al. |
| 11,181,840 B2 | 11/2021 | Nagata et al. |
| 11,181,845 B2 | 11/2021 | Shimoda et al. |
| 11,181,846 B2 | 11/2021 | Kinumatsu et al. |
| 2005/0260514 A1 | 11/2005 | Mihara et al. |
| 2006/0194071 A1 | 8/2006 | Yano et al. |
| 2008/0057431 A1* | 3/2008 | Lai ................ G03G 9/08706 430/110.2 |
| 2008/0299482 A1 | 12/2008 | Kato et al. |
| 2009/0233212 A1 | 9/2009 | Fujikawa et al. |
| 2010/0035171 A1 | 2/2010 | Watanabe et al. |
| 2012/0172562 A1 | 7/2012 | Kenmoku et al. |
| 2013/0065174 A1 | 3/2013 | Itabashi et al. |
| 2014/0356779 A1 | 12/2014 | Hasegawa et al. |
| 2014/0377697 A1 | 12/2014 | Nishiura et al. |
| 2015/0004539 A1 | 1/2015 | Watanabe et al. |
| 2015/0378274 A1 | 12/2015 | Abe et al. |
| 2016/0187797 A1* | 6/2016 | Kosaki ............. G03G 9/09371 430/110.2 |
| 2018/0031988 A1 | 2/2018 | Toyoizumi et al. |
| 2019/0235404 A1 | 8/2019 | Kamikura |
| 2020/0341395 A1 | 10/2020 | Ookubo et al. |
| 2020/0341398 A1 | 10/2020 | Kawamura et al. |
| 2020/0356019 A1 | 11/2020 | Matsui et al. |
| 2020/0363742 A1 | 11/2020 | Kyuushima et al. |
| 2020/0409282 A1 | 12/2020 | Unno et al. |
| 2021/0003932 A1 | 1/2021 | Tsuda et al. |
| 2021/0026261 A1 | 1/2021 | Ogaki et al. |
| 2021/0026262 A1 | 1/2021 | Kenmoku et al. |
| 2021/0026264 A1 | 1/2021 | Kamikura et al. |
| 2021/0026265 A1 | 1/2021 | Kamikura et al. |
| 2021/0132519 A1 | 5/2021 | Hashimoto et al. |
| 2021/0181646 A1 | 6/2021 | Matsui et al. |
| 2021/0181648 A1 | 6/2021 | Shimano et al. |
| 2021/0302851 A1 | 9/2021 | Toyoizumi et al. |
| 2021/0311405 A1 | 10/2021 | Shiotari et al. |
| 2021/0405549 A1 | 12/2021 | Ookubo et al. |

FOREIGN PATENT DOCUMENTS

| | | |
|---|---|---|
| DE | 102019101831 A | 8/2019 |
| EP | 3929659 A1 | 12/2021 |
| GB | 152705 A | 9/1978 |
| GB | 1525705 A | 9/1978 |
| GB | 2136981 A | 9/1984 |
| JP | 4-229873 A | 8/1992 |
| JP | 5100476 A | 4/1993 |
| JP | 6-295096 A | 10/1994 |
| JP | 7-239573 A | 9/1995 |
| JP | H10213924 A * | 8/1998 |
| JP | 11-282194 A | 10/1999 |
| JP | 2000-122341 A | 4/2000 |

(56) References Cited

FOREIGN PATENT DOCUMENTS

| | | |
|---|---|---|
| JP | 2002-249530 A | 9/2002 |
| JP | 2005-148409 A | 6/2005 |
| JP | 2006-259359 A | 9/2006 |
| JP | 2007-79304 A | 3/2007 |
| JP | 2007-279712 A | 10/2007 |
| JP | 2010-181439 A | 8/2010 |
| JP | 2012-189692 A | 10/2012 |
| JP | 2013-174745 A | 9/2013 |
| JP | 2014-130243 A | 7/2014 |
| JP | 2015-31767 A | 2/2015 |
| JP | 2015-43049 A | 3/2015 |
| JP | 2015-75662 A | 4/2015 |
| JP | 2016-11972 A | 1/2016 |
| JP | 2016-11973 A | 1/2016 |
| JP | 2017-49404 A | 3/2017 |
| JP | 2017-62367 A | 3/2017 |
| JP | 2017-167446 A | 9/2017 |
| JP | 2018-151513 A | 9/2018 |
| JP | 2019-3082 A | 1/2019 |
| JP | 2019-28475 A | 2/2019 |
| JP | 2019-133145 A | 8/2019 |
| JP | 2019-219643 A | 12/2019 |
| JP | 2019-219647 A | 12/2019 |
| JP | 2020-63412 A | 4/2020 |

* cited by examiner

TONER AND METHOD FOR MANUFACTURING TONER

BACKGROUND OF THE INVENTION

Field of the Invention

The present disclosures relate to a toner for use in an electrophotographic method, an electrostatic recording method and a toner jet recording method, and to a method for manufacturing the toner.

Description of the Related Art

In the field of electrophotography, energy savings in various electrophotographic processes are being required to reduce energy consumption. A large proportion of the power consumption of a laser beam printer is consumed as thermal energy by the fixing unit during the toner fixing process, and efforts are being made to reduce power consumption by lowering the fixing temperature. An effective way of reducing the fixing temperature of a toner is to improve the low-temperature fixability thereof.

On the other hand, toners also need to have storability (heat-resistant storage stability) to withstand high-temperature storage environments. To give toners both low-temperature fixability and heat-resistant storage stability, methods are being studied using side-chain crystalline resins with melting points of 50.0° C. to 90.0° C. for the binder resin (Japanese Patent Application Publication No. 2014-130243). Japanese Patent Application Publication No. 2014-130243 also describes favorable image stackability.

SUMMARY OF THE INVENTION

However, it was found when the toner described in Japanese Patent Application Publication No. 2014-130243 is used to perform continuous double-sided printing at a high print percentage in a high-temperature, high-humidity environment, the paper stacked in the output tray is soiled in some cases, indicating poor paper discharge adhesiveness (image stackability). It was also found that such a toner is liable to charge-up in low-temperature, low-humidity use environments, and image defects such as fogging may occur.

The toner and the method for manufacturing a toner of these disclosures are a toner and a method for manufacturing a toner that has excellent low-temperature fixability and heat-resistant storage stability as well as excellent paper discharge adhesiveness in high-temperature, high-humidity environments, and is capable of forming high-quality images when used in low-temperature, low-humidity environments.

The toner of the present disclosure has the characteristics that the toner comprising a toner particle comprising a resin A and a resin B, wherein the resin A has a structure represented by formula (1) below, and the resin B has a monomer unit represented by formula (2) below.

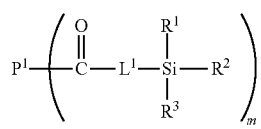

In formula (1), $P^1$ represents a polymer segment, each of $R^1$ to $R^3$ independently represents a hydrogen atom, an alkyl group having 1 or more carbon atoms, a hydroxy group or an alkoxy group having 1 or more carbon atoms, at least one of $R^1$ to $R^3$ is a hydroxy group or an alkoxy group having 1 or more carbon atoms, m represents a positive integer; and $L^1$ is an alkylene group having not more than 8 carbon atoms, *—O—**, *—$OR^5$—**, *—NH—** or *—$NHR^6$—**, in which * represents a bonding moiety with a carbonyl group in formula (1), ** represents a bonding moiety with a silicon atom, each of $R^5$ and $R^6$ independently represents an alkylene group having not more than 8 carbon atoms, and each carbon may optionally have a hydroxy group as a substituent; and when m is 2 or more, the multiple $L^1$s, multiple $R^1$s, multiple $R^2$s and multiple $R^3$s may each be the same or different.

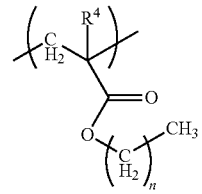

In formula (2), $R^4$ represents a hydrogen atom or methyl group, and n is an integer from 11 to 35.

With these disclosures, it is possible to provide a toner and a method for manufacturing a toner that has excellent low-temperature fixability and heat-resistant storage stability as well as excellent paper discharge adhesiveness in high-temperature, high-humidity environments, and is capable of forming high-quality images when used in low-temperature, low-humidity environments. Further features of the present invention will become apparent from the following description of exemplary embodiments.

DESCRIPTION OF THE EMBODIMENTS

Further, in the present disclosure, the expression of "from XX to YY" or "XX to YY" indicating a numerical range means a numerical range including a lower limit and an upper limit which are end points, unless otherwise specified. A monomer unit is a reacted form of a monomer substance in a polymer.

The toner of these disclosures is explained in detail below.

The toner of the present disclosure has the characteristics that the toner comprising a toner particle comprising a resin A and a resin B, wherein the resin A has a structure represented by formula (1) below, and the resin B has a monomer unit represented by formula (2) below.

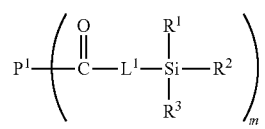

In formula (1),

P¹ represents a polymer segment, each of $R^1$ to $R^3$ independently represents a hydrogen atom, an alkyl group having 1 or more carbon atoms, a hydroxy group or an alkoxy group having 1 or more carbon atoms, at least one of $R^1$ to $R^3$ is a hydroxy group or an alkoxy group having 1 or more carbon atoms, m represents a positive integer; and $L^1$ is an alkylene group having not more than 8 carbon atoms, *—O—**, *—OR⁵—**, *—NH—** or *—NHR⁶—**, in which * represents a bonding moiety with a carbonyl group in formula (1), ** represents a bonding moiety with a silicon atom, each of $R^5$ and $R^6$ independently represents an alkylene group having not more than 8 carbon atoms, and each carbon may optionally have a hydroxy group as a substituent; and when m is 2 or more, the multiple $L^1$s, multiple $R^1$s, multiple $R^2$s and multiple $R^3$s may each be the same or different.

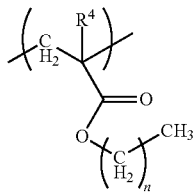

In formula (2), $R^4$ represents a hydrogen atom or methyl group, and n is an integer from 11 to 35.

A toner having these features has excellent low-temperature fixability and heat-resistant storage stability and excellent paper discharge adhesiveness in high-temperature, high-humidity environments, and can form high-quality images when used in low-temperature, low-humidity environments. The inventors believe that these effects were obtained for reasons such as the following.

The resin B has a monomer unit represented by formula (2). The monomer unit represented by formula (2) has a high degree of freedom in the molecular chains, and low-temperature fixability can be improved because the glass transition temperature (Tg) of the resin is easily reduced during fixing. When using a resin having the monomer unit represented by formula (2), however, it is thought that because the Tg of the fixed image also tends to be reduced, paper discharge adhesion is likely to occur due to heat and the pressure from the weight of the paper when papers in a heated state are stacked in the output tray immediately after paper discharge.

The carboxyl groups of the resin A and the ester groups of the resin B have strong affinity, and it is thought that the resin A and resin B are likely to be arranged spatially close to one another in the toner after fixing. If the resin A and resin B are even closer to one another within this spatial orientation, the long-chain alkyl segments of the resin B are likely to assemble locally because the long-chain alkyl segments of the resin B have poor affinity for the silane segments of the resin A, and the assembled long-chain alkyl segments are likely to align in microregions. It is thought that domains are formed in the toner particle as a result.

Because molecular movements are constrained in the formed domains, the decrease in the Tg of the image can be suppressed. It is thought that when $L^1$ in the resin A is an alkylene group having not more than 8 carbon atoms, *—O—**, *—OR⁵—*, *—NH—** or *—NHR⁶—** (in which * represents a bonding moiety with a carbonyl group in formula (1), ** represents a bonding moiety with a silicon atom, each of $R^5$ and $R^6$ independently represents an alkylene group having not more than 8 carbon atoms, and each carbon may optionally have a hydroxy group as a substituent), the above effects become more pronounced due to the short distance between the silane segments and the carbonyl groups of the resin A, producing the effects of these disclosures.

The resin A is explained in detail below. The resin A has the structure represented by the following formula (1):

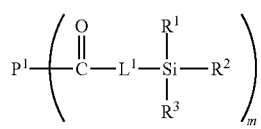

In formula (1), P¹ represents a polymer segment, each of $R^1$ to $R^3$ independently represents a hydrogen atom, an alkyl group having 1 or more carbon atoms, a hydroxy group or an alkoxy group having 1 or more carbon atoms, at least one of $R^1$ to $R^3$ is a hydroxy group or an alkoxy group having 1 or more carbon atoms, m represents a positive integer; and $L^1$ is an alkylene group having not more than 8 carbon atoms, *—O—**, *—OR⁵—**, *—NH—** or *—NHR⁶—**, in which * represents a bonding moiety with a carbonyl group in formula (1), ** represents a bonding moiety with a silicon atom, each of $R^5$ and $R^6$ independently represents an alkylene group having not more than 8 carbon atoms, and each carbon may optionally have a hydroxy group as a substituent; and when m is 2 or more, the multiple $L^1$s, multiple $R^1$s, multiple $R^2$s and multiple $R^3$s may each be the same or different.

When $L^1$ in the formula (1) is an alkylene group having not more than 8 carbon atoms or *—O—**, *—OR⁵—**, *—NH—** or *—NHR⁶—** (in which * represents a bonding moiety with a carbonyl group in formula (1), ** represents a bonding moiety with a silicon atom, each of $R^5$ and $R^6$ independently represents an alkylene group having not more than 8 carbon atoms, and each carbon may optionally have a hydroxy group as a substituent), paper discharge adhesiveness is improved for the reasons described above.

Furthermore, a resin having the monomer unit represented by formula (2) is liable to charge-up because it tends to accumulate charge in low-temperature, low-humidity environments, and image defects such as fogging are likely in some cases. Because the toner particle of these disclosures contains the resin B having a monomer unit represented by the formula (2) and the resin A having a structure represented by the formula (1), the resin A and resin B are likely to be arranged spatially close to one another, and consequently the charge of the resin B is more easily transmitted to the carbonyl groups of the resin A through the ester segments of the resin B, and charge-up in low-temperature, low-humidity environments can be suppressed. It is therefore possible to suppress image defects such as fogging and improve image quality.

$L^1$ in formula (1) is preferably *—NHR⁶—**. When $L^1$ is *—NHR⁶—**, the above effects are easily obtained, and paper discharge adhesiveness is easily improved. It is also easy to improve image quality in low-temperature, low-humidity environments. The carbon number of the alkylene group represented by $R^6$ is preferably 1 to 4, or more preferably 1 to 3.

The effects of the invention are also easily obtained when $L^1$ in the resin A is *—$OR^5$—**. The carbon number of $R^5$ is preferably 1 to 4, or more preferably 1 to 3. When $L^1$ is an alkylene group, the carbon number of the alkylene group is preferably 1 to 4, or more preferably 1 to 3.

Each of $R^1$ to $R^3$ in formula (1) independently represents a hydrogen atom, an alkyl group having 1 or more carbon atoms, an alkoxy group having 1 or more carbon atoms or a hydroxy group, and at least one of $R^1$ to $R^3$ is an alkoxy group having 1 or more carbon atoms or a hydroxy group. Of the substituents that may be represented by $R^1$ to $R^3$, the alkyl groups preferably have 1 to 20 carbon atoms, or more preferably 1 to 4 carbon atoms. The alkoxy groups preferably have 1 to 20, or more preferably 1 to 4, or still more preferably 1 to 3, or especially 1 to 2 carbon atoms.

To make at least one of $R^1$ to $R^3$ in formula (1) be a hydroxy group, a resin A in which at least one of $R^1$ to $R^3$ is an alkoxy group may be hydrolyzed to substitute a hydroxy group for the alkoxy group.

Any hydrolysis method may be used, such as the following method for example. The resin A in which at least one of $R^1$ to $R^3$ is an alkoxy group is dissolved or suspended in a suitable solvent (or a polymerizable monomer), adjusted to an acidic pH with an acid or alkali, and mixed to perform hydrolysis. Hydrolysis may also be performed during toner particle manufacture.

Any method may be used for forming the structure represented by formula (1), such as the following methods for example.

The structure may be formed by a method of reacting the carboxyl groups in the resin having an amino silane coupling agent, a method of polymerizing a meth(acrylic) silane coupling agent having the ethylenically unsaturated bond segments or monomers having ethylenically unsaturated bonds in the resin, a method of reacting the hydroxyl groups in the resin having an isocyanate silane coupling agent, or a method of reacting the isocyanate groups in the resin having an amino silane coupling agent or the like.

Examples of amino silane coupling agents include 3-aminopropyl triethoxysilane, 3-aminopropyl trimethoxysilane and 3-aminopropyl dimethoxymethylsilane.

Examples of (meth)acrylic silane coupling agents include 3-acryloxypropyl trimethoxysilane, 3-methacryloxypropyl trimethoxysilane, 3-acryloxypropyl triethoxysilane, 3-methacryloxypropyl triethoxysilane, 8-acryloxyoctyl triethoxysilane, 8-methacryloxyoctyl triethoxysilane, 3-(triethoxysilyl) methyl acrylate, 3-(triethoxysilyl) methyl methacrylate, 3-[dimethoxy (methyl)silyl] propyl acrylate, 3-[dimethoxy (methyl)silyl] propyl methacrylate, [dimethoxy (methyl)silyl] methyl acrylate, [dimethoxy (methyl)silyl] methyl methacrylate, 3-(methacyloyloxy) propyltris (trimethylsilyloxy) silane and the like.

Examples of isocyanate coupling agents include isocyanatomethyl trimethoxysilane, isocyanatomethyl triethoxysilane, 3-isocyanatopropyl trimethoxysilane, 3-isocyanatopropyl triethoxysilane, 3-isocyanatopropyl methyl dimethoxysialne and the like.

The content of the structure represented by formula (4) below in the resin A is preferably from 0.5 mass % to 10.0 mass %. If it is at least 0.5 mass %, paper discharge adhesiveness and image quality in low-temperature, low-humidity environments can be easily improved. If it is not more than 10.0 mass %, it is possible to suppress an increase in the hydrophilicity of the resin as a whole due to an excess of silane segments in the resin A, and paper discharge adhesiveness and image quality in low-temperature, low-humidity environments can be easily improved because the spatial arrangement of the resin A and resin B are not impeded. A preferred range is from 1.0 mass % to 7.0 mass %. The content of the structure represented by formula (4) below in the resin A can be controlled by adjusting the added amount of the silane coupling agent and the amount of functional groups reacted with the silane coupling agent.

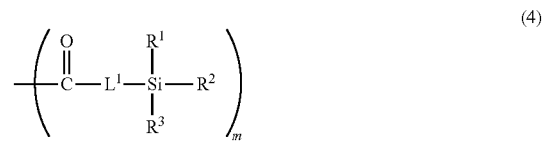

In formula (4), $R^1$ to $R^3$ are the same as the $R^1$ to $R^3$ in the formula (1), and $L^1$ is the same as the $L^1$ in the formula (1).

When a weight-average molecular weight of the resin A is represented by MwA, the MwA A is preferably from 8,000 to 50,000. If it is at least 8,000, heat-resistant storage stability is easily improved because low-molecular-weight components are likely to be few. If the MwA is not more than 50,000, paper discharge adhesiveness is easily improved because molecular mobility is high after fixing and spatial arrangement is more easily achieved. The MwA is more preferably from 12,000 to 30,000. The MwA can be controlled by changing the reaction temperature of the resin, the reaction time, the monomer composition, the amount of the initiator and the like.

$P^1$ in formula (1) above is not particular limited, but examples include polyester resin segments, vinyl resin segments, polyurethane resin segments, polyurea resin segments, polycarbonate resin segments, phenol resin segments, polyolefin resin segments, epoxy resin segments and the like.

From the standpoint of improving paper discharge adhesiveness, it is desirable for $P^1$ in the resin A to include polyester resin segments or vinyl resin segments. For example, these may also be hybrid resin segments of a polyester resin and a vinyl resin.

Polyvalent carboxylic acids and polyhydric alcohols may be used as polymerization monomers for manufacturing the polyester resin segments.

Examples of polyvalent carboxylic acids include oxalic acid, glutaric acid, succinic acid, maleic acid, adipic acid, beta-methyladipic acid, azelaic acid, sebacic acid, nonane dicarboxylic acid, decane dicarboxylic acid, undecane dicarboxylic acid, dodecane dicarboxylic acid, fumaric acid, citraconic acid, diglycolic acid, cyclohexane-3,5-diene-1,2-dicarboxylic acid, hexahydroterephthalic acid, malonic acid, pimelic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediglycolic acid, p-phenylenediglycolic acid, o-phenylenediglycolic acid, diphenylacetic acid, diphenyl-p,p'-dicarboxylic acid, naphthalene-1,4-dicarboxylic acid, naphthalene-1,5-dicarboxylic acid, naphthalene-2, 6-dicarboxylic acid, anthracene dicarboxylic acid, cyclohexane dicarboxylic acid and the like. Examples of polyvalent carboxylic acids other than dicarboxylic acids include trimellitic acid, pyromellitic acid, naphthalene tricarboxylic acid, naphthalene tetracarboxylic acid, pyrene tricarboxylic acid, pyrene tetracarboxylic acid and the like.

Examples of polyhydric alcohols include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexane dimethanol, dipropylene glycol, polyethylene glycol, polypropylene glycol, polytetramethylene glycol, sorbitol, 1,2,3,6-hexanetetrol, 1,4-sorbitane, pentaerythritol, dipentaerythritol, tripentaerythritol, 1,2,4-butanetriol, 1,2,5-pentanetriol, glycerol, 2-methylpropane triol, 2-methyl-1,2,4-butanetriol, isosorbitol, trimethylol ethane, trimethylol propane, 1,3,5-trihydroxymethyl benzene, bisphenol A, bisphenol A ethylene oxide adducts, bisphenol A propylene oxide adducts, hydrogenated bisphenol A, hydrogenated bisphenol A ethylene oxide adducts, hydrogenated bisphenol A propylene oxide adducts and the like.

Examples of vinyl monomers that can be used to manufacture the vinyl resin segments include styrene, alpha-methyl styrene, beta-methyl styrene, o-methyl styrene, m-methyl styrene, p-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene, p-phenyl styrene, methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate, 2-hydroxyethyl acrylate, 2-benzoyl oxyethyl acrylate, methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, diethyl phosphate ethyl methacrylate, 2-hydroxyethyl methacrylate, dibutyl phosphate ethyl methacrylate, maleic acid, acrylic acid, methacrylic acid and the like.

The resin A may also further have a monomer unit represented by formula (3) below.

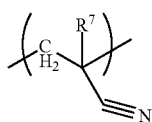

(3)

In formula (3), $R^7$ represents a hydrogen atom or methyl group.

When the resin A has a monomer unit represented by formula (3), image quality in low-temperature, low-humidity environments is easily improved. The method for introducing the monomer unit represented by the formula (3) into the resin A is not particularly limited, but in one method acrylonitrile or methacrylonitrile is used as one of the polymerizable monomers for forming the resin A. The monomer unit represented by formula (3) preferably constitutes 5.0 mass % to 60.0 mass % of the resin A.

The resin A may be introduced into the toner particle by adding the polymerized resin A during toner particle manufacture, or by a manufacturing method such as the following, but the method is not limited to these.

The resin A may be introduced into the toner particle through a method having a step of dispersing a toner base particle comprising the resin B in an aqueous medium to obtain a toner slurry, and a step of adding a radical polymerization initiator and a monomer composition comprising the monomer represented by formula (6) below to the resulting toner slurry and forming the resin A on the surface of the toner base particle.

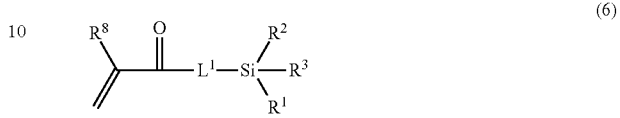

(6)

In formula (6), $R^8$ represents a hydrogen atom or methyl group.

The resin A preferably has at least one selected from the group consisting of monomer units represented by the following formulae (7) to (10).

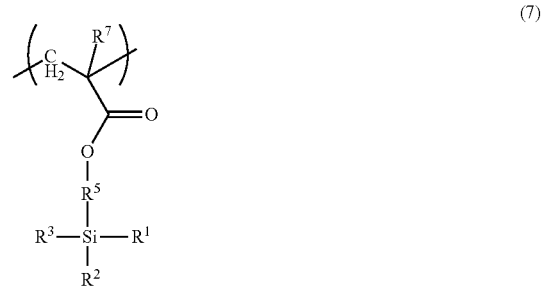

(7)

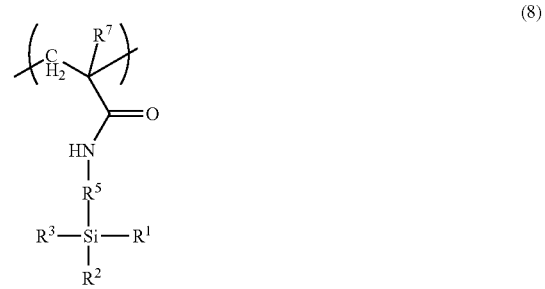

(8)

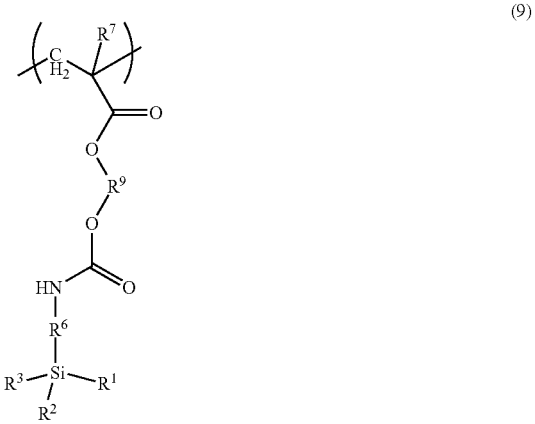

(9)

-continued

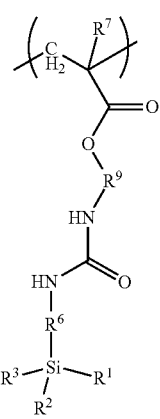

(10)

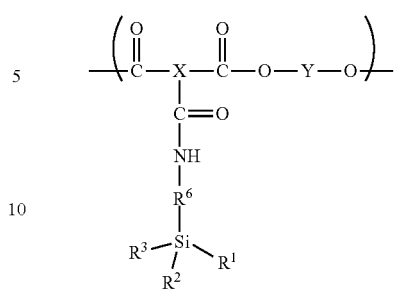

(14)

$R^1$ to $R^3$ and $R^5$ to $R^6$ in formulae (7) to (10) are the same as $R^1$ to $R^3$ and $R^5$ to $R^6$ in formula (1), respectively, and $R^7$ represents a hydrogen atom or methyl group, $R^9$ and $R^{10}$ in formulae (9) and (10) represent $C_{1-6}$ alkylene groups.

The formula (1) is preferably at least one selected from the group consisting of the structures represented by the following formulae (11) and (12) for example.

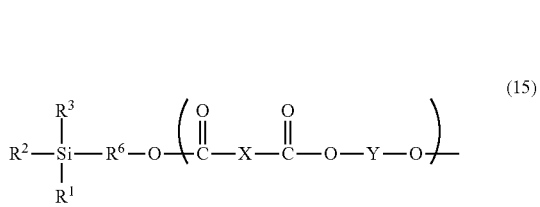

(15)

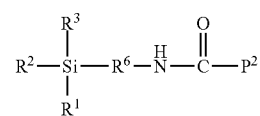

(11)

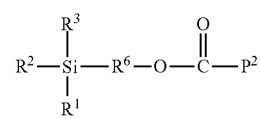

(12)

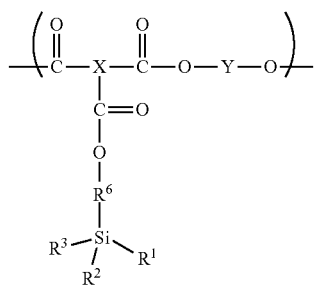

(16)

$R_1$ to $R^3$ and $R_5$ to $R^6$ in formulae (11) to (12) are the same as $R_1$ to $R^3$ and $R_5$ to $R^6$ in formula (1), respectively, and $P^2$ in formulae (11) and (12) represents the main chain skeleton of a polyester resin.

The structure represented by formula (11) is not particularly limited, but specific examples include structures such as those of formula (13) or (14) below. The structure represented by formula (12) is also not particularly limited, but specific examples include structures such as those of formula (15) or (16) below.

In formulae (13) to (16), $R^1$ to $R^3$ and $R^6$ are the same as the $R^1$ to $R^3$ and $R^6$ in formula (1), respectively, X represents a residue obtained by removing the carboxy group from a polyvalent carboxylic acid, Y represents a residue obtained by removing the hydroxy group from a polyhydric alcohol, and the residue obtained by removing the carboxy group from the polyvalent carboxylic acid and the residue obtained by removing the hydroxy group from the polyhydric alcohol are obtained by condensing the polymerization monomers that may be used in manufacturing the polyester resin segments as described above.

X and Y may each be one kind of structure or multiple kinds of structures. Of these, X is preferably at least one selected from the group consisting of the (preferably $C_{1-12}$) alkylene groups, (preferably $C_{2-4}$) alkenylene groups and (preferably $C_{6-12}$) phenylene groups. Y is preferably at least one selected from the group consisting of the (preferably $C_{1-12}$) alkylene groups and (preferably $C_{6-12}$) phenylene groups and the structures represented by formula (17) below:

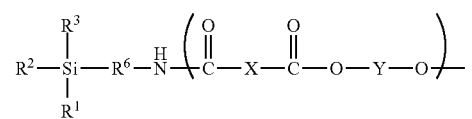

(13)

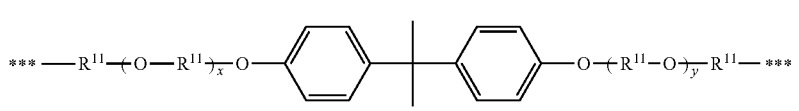

(17)

In formula (17), $R^{11}$ is an ethylene group or propylene group, x and y are each 0 or an integer greater than 0, and the average value of x+y is 2 to 10. In formula (17), *** represents a bonding moiety with an oxygen atom in formulae (13) to (16).

The resin B is explained here in detail. The resin B has a monomer unit represented by formula (2):

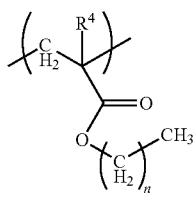

(2)

In formula (2), $R^4$ represents a hydrogen atom or methyl group and n is an integer of 11 to 35. When n is at least 11 in formula (2), a plasticization effect is obtained during fixing, and low-temperature fixability is improved. When n is not more than 35, the charging performance is good in low-temperature, low-humidity environments, and high-quality images are obtained. The preferred range of n is from 17 to 29, or more preferably from 17 to 21.

The content of the monomer unit represented by formula (2) in the resin B is preferably from 5.0 mass % to 95.0 mass %. Within this range, it is easy to achieve both low-temperature fixability and image quality in low-temperature, low-humidity environments. A more preferred range is from 8.0 mass % to 80.0 mass %.

One method for introducing the monomer unit represented by formula (2) into the resin B is to polymerize a monomer such as the following with a resin comprising a vinyl monomer or an ethylenically unsaturated bond for example.

Examples of monomers for introducing the monomer unit represented by formula (2) into the resin B include dodecyl (meth)acrylate, tetradecyl (meth)acrylate, stearyl (meth)acrylate, nonadecyl (meth)acrylate, eicosyl (meth)acrylate, heneicosyl (meth)acrylate, behenyl (meth)acrylate, lignoceryl (meth)acrylate, ceryl (meth)acrylate, octacosyl (meth)acrylate, myristyl (meth)acrylate, dotriacontyl (meth)acrylate, hexadecyl (meth)acrylate, lauryl (meth)acrylate and 2-decyltetradecyl (meth)acrylate.

Resin B preferably has a monomer unit represented by formula (3) below.

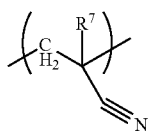

(3)

In formula (3), $R^7$ represents a hydrogen atom or methyl group.

When resin B has a monomer unit represented by formula (3), paper discharge adhesiveness and heat-resistant storage stability are further improved because the monomer unit represented by formula (2) can more easily form domains.

The method for introducing the monomer unit represented by formula (3) into the resin B is not particularly limited but may be a method of polymerizing at least one selected from the group consisting of acrylonitrile and methacrylonitrile having the ethylenically unsaturated bonds in the resin B, or a method of polymerizing a monomer having ethylenically unsaturated bonds having at least one selected from the group consisting of acrylonitrile and methacrylonitrile. The content of the monomer unit represented by formula (3) in the resin B is preferably 5.0 mass % to 60.0 mass %.

When a weight-average molecular weight of the resin B is represented by MwB, the MwB is preferably from 15,000 to 250,000. If the MwB is at least 15,000, heat-resistant storage stability is easily improved because low-molecular-weight components are likely to be few. If the MwB is not more than 100,000, deformation occurs more easily during fixing and low-temperature fixability is easily improved. A more preferred range of the MwB is from 20,000 to 80,000. The MwB can be controlled by changing the reaction temperature, reaction time, monomer charge ratio, amount of the initiator and the like when manufacturing the resin B.

The resin B is not particularly limited as long as it has a monomer unit represented by formula (2), and a known resin such as a vinyl resin, polyester resin or epoxy resin may be used. Of these, a vinyl resin is preferred as the resin B. Examples of vinyl resins include polymers of monomers comprising ethylenically unsaturated bonds for example. For example, the monomers that may be used in the vinyl resin segments of the resin A above for example may be used as vinyl monomers for manufactured the vinyl resin.

The method for introducing the resin B into the toner particle is not particularly limited but may be a method of adding the synthesized resin B during toner particle manufacture, or a method such as the following.

This method comprises a step of dispersing or suspending a polymerizable monomer composition for obtaining the resin B in water and polymerizing this polymerizable monomer composition to obtain the resin B, a step of dispersing a toner base particle comprising the resin B in an aqueous medium to obtain a toner slurry, and a step of adding a radical polymerization initiator and a monomer composition comprising a monomer represented by formula (6) to the resulting toner slurry and forming the resin A on the surface of the toner base particle.

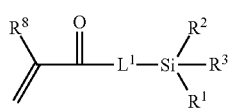

(6)

In formula (6), $R^8$ represents a hydrogen atom or a methyl group.

The toner particle is explained in detail below.

When a SP value of the resin A by the Fedors method is represented by SPA SPA $[(J/m^3)^{0.5}]$ and a SP value of the resin B by the Fedors method is represented by SPB $[(J/m^3)^{0.5}]$, SPA and SPB preferably satisfy a following relation: $|SPA-SPB| \le 2.00$. If $|SPA-SPB| \le 2.00$, the effect of improving paper discharge adhesiveness is easily obtained because the resin A and resin B are more likely to be spatially arranged after fixing. A more preferred range of $|SPA-SPB|$ is $|SPA-SPB| \le 1.00$. SPA and SPB can be controlled by changing the compositions of the resins A and B.

The minimum value of $|SPA-SPB|$ is not particularly limited but may be at least 0.00.

SPA is preferably 19.00 to 23.00 $[(J/m^3)^{0.5}]$. SPB is preferably 18.00 to 23.00 $[(J/m^3)^{0.5}]$.

When a content of the resin A in the toner particle is represented by MA (mass %) and a content of the resin B in the toner particle is represented by MB (mass %), MA and MB preferably satisfy a following relation: 0.0050≤MA/MB≤0.2000. If MA/MB is at least 0.0050, paper discharge adhesiveness is easily improved. If MA/MB is not more than 0.2000, heat-resistant storage stability is easily improved. MA/MB is more preferably 0.0050≤MA/MB≤0.1000.

Moreover, the content MA of the resin A in the toner particle is preferably 0.40 mass % to 4.0 mass %. Furthermore, the content MB of the resin B in the toner particle is preferably 40.0 mass % to 90.0 mass %.

In measurement of the toner particle surface by time-of-flight secondary ion mass spectrometry (TOF-SIMS), the ion count derived from silicon with a mass number of 28 relative to the total ion count at mass numbers 1 to 1,800 is preferably 0.0010 to 0.0050, or more preferably 0.0020 to 0.0040.

It is thought that if this ion count derived from silicon is 0.0010 to 0.0050, this means that the resin A is arranged near the surface of the toner particle. It is thought that the phenomenon of paper discharge adhesion is greatly affected by melting of the toner surface. Thus, it is thought that if the resin A is arranged near the surface of the toner particle, the effect of suppressing such paper discharge adhesion as described above can be easily achieved. Methods for controlling the ion count derived from silicon include changing the composition and added amount of the resin A and changing the toner particle manufacturing method for introducing the resin A.

The toner particle may also contain a release agent. Examples of release agents include aliphatic hydrocarbon waxes, oxides of aliphatic hydrocarbon waxes, block copolymers of aliphatic hydrocarbon waxes, waxes composed primarily of fatty acid esters, waxes such as deoxidized carnauba wax obtained by partially or complete deoxidation of fatty acid esters, partial esterification products of fatty acids and polyhydric alcohols, methyl ester compounds having hydroxy groups obtained by hydrogenation of vegetable oils and fats, and Fischer-Tropsch wax and the like. The content of the release agent in the toner particle is preferably from 1.50 mass % to 20.0 mass %.

The method for manufacturing the toner particle is explained here.

The toner particle may be manufactured by a known method. For example, this may be a suspension polymerization method in which a polymerizable monomer composition comprising a polymerizable monomer for obtaining the resin B, the resin A or a polymerizable monomer for obtaining the resin A, and a release agent and the like as necessary, is suspended and granulated in an aqueous medium to polymerize the polymerizable monomers in the polymerizable monomer composition; a kneading pulverization method in which the various constituent materials of the toner including the resin B, the resin A and a release agent and the like as necessary are kneaded, pulverized and classified; an emulsion aggregation method in which a dispersion of the emulsified and dispersed resin B and resin A is mixed with a dispersion of the release agent and the like as necessary, and aggregated and heat fused to obtain a toner particle; an emulsion polymerization and aggregation method in which a polymerizable monomer for constituting the resin B is emulsion polymerized, and the resulting dispersion is mixed with a dispersion of the emulsified and dispersed resin A and a dispersion of the release agent of the like as necessary, and aggregated and heat fused to obtain a toner particle; or a dissolution suspension method in which an organic solvent dispersion comprising the resin A, the resin B and a release agent and the like as necessary in an organic solvent is suspended and granulated in an aqueous medium and the like.

The toner may also be manufactured by the following manufacturing method.

This is a toner manufacturing method having a step of dispersing a toner base particle comprising the resin B in an aqueous medium to obtain a toner slurry, and a step of adding a radical polymerization initiator and a monomer composition comprising the monomer represented by formula (6) below to the resulting toner slurry and forming the resin A on the surface of the toner base particle.

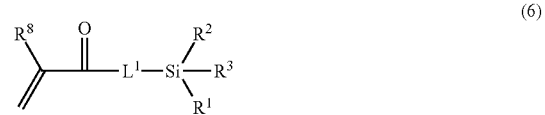

(6)

In formula (6), $R^8$ represents a hydrogen atom or methyl group.

The toner particle may be used as is as a toner, but an external additive may also be added externally to the toner particle to improve the image quality of the toner. Preferred examples of external additives include inorganic fine particles such as silica particles, titanium oxide particles, aluminum oxide particles and the like. These inorganic fine particles are preferably hydrophobically treated with a hydrophobic agent such as a silane coupling agent or silicone oil or a mixture of these or the like. An external additive other than the above may also be added as necessary to the toner particle in the toner. The added amount of the external additive is preferably from 0.5 to 5.0 mass parts per 100 mass parts of the toner particle.

The toner particle may also contain a colorant. The colorant is not particularly limited, and the known colorants shown below may be used for example.

Examples of yellow pigments include yellow iron oxide, Naples yellow, naphthol yellow S, Hansa yellow G, Hansa yellow 10G, benzidine yellow G, benzidine yellow GR, quinoline yellow lake, permanent yellow NCG, condensed azo compounds such as tartrazine lake, and isoindolinone compounds, anthraquinone compounds, azo metal complexes, methine compounds and allylamide compounds.

Specific examples include C.I. pigment yellow 12, 13, 14, 15, 17, 62, 74, 83, 93, 94, 95, 109, 110, 111, 128, 129, 147, 155, 168, 180 and the like.

Examples of orange pigments include permanent orange GTR, pyrazolone orange, Vulcan orange, benzidine orange G, indanthrene brilliant orange RK, indanthrene brilliant orange GK and the like.

Examples of red pigments include red iron oxide, permanent red 4R, lithol red, pyrazolone red, watching red calcium salt, lake red C, lake red D, brilliant carmine 6B, brilliant carmine 3B, eosin lake, rhodamine lake B, condensed azo compounds such as alizarin lake, and diketopyrrolopyrrole compounds, anthraquinone compounds, quinacridone compounds, basic dye lake compounds, naphthol compounds, benzimidazolone compounds, thioindigo compound and perylene compounds.

Specific examples include C.I. pigment red 2, 3, 5, 6, 7, 23, 48:2, 48:3, 48:4, 57:1, 81:1, 122, 144, 146, 166, 169, 177, 184, 185, 202, 206, 220, 221, 254 and the like.

Examples of blue pigments include alkali blue lake, Victoria blue lake, phthalocyanine blue, metal-free phthalocyanine blue, phthalocyanine blue partial chloride, copper phthalocyanine pigments such as fast sky blue and indathrene blue BG and derivatives of these, and anthraquinone compounds, basic dye lake compounds and the like.

Specific examples include C.I. pigment blue 1, 7, 15, 15:1, 15:2, 15:3, 15:4, 60, 62, 66 and the like.

Examples of black pigments include carbon black, aniline black, non-magnetic ferrite, magnetite, blacks obtained by blending the above yellow, red and blue colorants, and the like.

Of these colorants, one kind alone or a mixture of 2 or more kinds may be used, and these may also be used in a solid solution. The content of the colorant in the toner particle is preferably 3.0 mass % to 15.0 mass %.

The toner particle may also contain a charge control agent. A known charge control agent may be used. Charge control agents include those that control the negative charge properties of the toner and those that control the positive charge properties.

Examples of agents for controlling the negative charge properties of the toner include monoazo metal compounds, acetylacetone metal compounds, metal compounds of aromatic oxycarboxylic acids, aromatic dicarboxylic acids, oxycarboxylic acids and dicarboxylic acids, aromatic oxycarboxylic acids, aromatic mono- and polycarboxylic acids and their metal salts, anhydrides and esters of these, phenol derivatives such as bisphenols, urea derivatives, metal-containing salicylic acid compounds, metal-containing naphthoic acid compounds, boron compounds, quaternary ammonium salts, calixarenes and resin charge control agents.

On the other hand, examples of agents for controlling the positive charge properties of the toner include the following.

These include nigrosin and nigrosin denatured with fatty acid metal salts; guanidine compounds; imidazole compounds; quaternary ammonium salts such as tributylbenzyl ammonium-1-hydroxy-4-napthosulfonic acid salt and tetrabutyl ammonium tetrafluoroborate, onium salts such as phosphonium salts that are analogs of these, and lake pigments of these; triphenylmethane dyes and lake pigments of these (using phosphotungstic acid, phosphomolybdic acid, phosphotungstic molybdic acid, tannic acid, lauric acid, gallic acid or a ferricyanide or ferrocyanide or the like as the laking agent); metal salts of higher fatty acids; and resin charge control agents.

The methods for measuring the various physical properties of the toner are described below.

Separating External Additive from Toner

When the surface of the toner particle has been treated with an external additive or the like, the external additive is removed by the following methods to obtain a toner particle.

160 g of sucrose (Kishida Chemical) is added to 100 mL of deionized water and dissolved while using a water bath to obtain a concentrated sucrose solution. 31 g of this concentrated sucrose solution and 6 mL of Contaminon N (a 10 mass % aqueous solution of a pH 7 neutral detergent for cleaning precision measurement instruments, comprising a non-ionic surfactant, an anionic surfactant, and an organic builder, manufactured by Wako Pure Chemical Industries) are placed in a centrifuge tube (capacity 50 mL) to prepare a dispersion. 1.0 g of toner is added to this dispersion, and toner clumps are broken up with a spatula or the like.

The centrifuge tube is shaken for 20 minutes in a shaker at 350 spm (strokes per minute). After being shaken, the solution is transferred to a glass tube (capacity 50 mL) for a swing rotor and separated for 30 minutes at 3,500 rpm in a centrifuge (H-9R, Kokusan Co., Ltd.). This operation separates the external additive from the toner particle.

Thorough separation of the toner and the aqueous solution is confirmed visually, and the toner separated in the uppermost layer is collected with a spatula or the like. The collected toner is filtered with a vacuum filter unit and dried for at least 1 hour in a drier to obtain a toner particle. This operation is repeated multiple times to secure a sufficient quantity.

Method for Extracting Resin A and Resin B from Toner Particle

To extract the resin A from the toner particle, a tetrahydrofuran (THF) extract is separated by the solvent gradient method. The preparation methods are as follows.

10.0 g of the toner particle is weighed exactly, placed in a cylindrical filter paper (Toyo Filter Paper No. 84), and put in a Soxhlet extractor. This is extracted for 20 hours using 200 mL of THF as the solvent, and the solid obtained by removing the solvent from the extract is the THF-soluble component. The THF-soluble component contains the resin A or the resin B. This operation is performed multiple times to obtain the necessary quantity of the THF-soluble component.

Gradient preparative HPLC (Shimadzu LC-20AP high-pressure gradient preparation system, Waters Corp. 50 mmφ 250 mm SunFire preparation column) is used as the solvent gradient extraction method. The column temperature is 30° C., the flow rate is 50 m/min, and acetonitrile is used as the poor solvent and THF as the good solvent in the mobile phase.

0.02 g of the THF-soluble component obtained by extraction is dissolved in 1.5 mL of THF and used as the sample for separation. The mobile phase starts with a 100% composition of acetonitrile, and the THF ratio is increased at a rate of 4% per minute once 5 minutes have passed after sample injection so that the composition of the mobile phase is THF 100% after 25 minutes. The resulting fraction can be dried to separate the component. The resin A or resin B can be obtained in this way. $^{13}$C-NMR measurement can be used to distinguish which fractional component is the resin A and which is the resin B.

Measuring Content of Resin A and Content of Resin B in Toner Particle

The content of the resin A and the content of the resin B in the toner particle can be calculated from the input amounts of each resin or the polymerizable monomers for forming each resin during toner particle manufacture. Alternatively, the respective contents in the toner particle supplied to the Soxhlet extractor can be calculated by specifying and extracting the resin A and resin B from each fraction obtained by the methods for extracting the resin A and resin B from the toner particle.

Method for Confirming Structures of Resin A and Resin B

The high-molecular-weight segment $P^1$, $L^1$ segment and $R^1$ to $R^3$ segments in formula (1) as for the resin A and the monomer unit structures represented by formula (2) and formula (3) in the resin B are analyzed by $^1$H-NMR analysis, $^{13}$C-NMR analysis, and $^{29}$Si-NMR. The resin A or resin B by itself may be used as a measurement sample, or else the resin A or resin B extracted from the toner particle by the methods described above may be used. For the alkoxy groups or hydroxy groups of $R^1$ to $R^3$ in formula (1), the valences of the alkoxy or hydroxy groups for silicon atoms can be determined by the methods given below under "$^{29}$Si-NMR (solid) Measurement Conditions".

$^{29}$Si-NMR (Solid) Measurement Conditions
Unit: JEOL Resonance Co. JNM-ECX500II
Sample tube: 3.2 mmϕ
Sample volume: 150 mg
Measurement temperature: Room temperature
Pulse mode: CP/MAS
Measurement nuclear frequency: 97.38 MHz ($^{29}$Si)
Standard substance: DSS (external standard: 1.534 ppm)
Sample rotation: 10 kHz
Contact time: 10 ms
Delay time: 2 s
Cumulative number: 2,000 to 8,000 times The abundance ratios can be obtained by peak separation and integration in curve fitting of multiple silane components according to the number of oxygen atoms bound to Si. The valences of the alkoxy groups and hydroxy group of $R^1$ to $R^3$ in formula (1) relative to silicon atoms can thus be confirmed. $P^1$, $L^1$ and $R^1$ to $R^3$ in formula (1) and the monomer unit structures represented by formulae (2) and (3) in the resin B can be confirmed by $^{13}$C-NMR (solid) measurement. The measurement conditions are as follows.

$^{13}$C-NMR (Solid) Measurement Conditions
Unit: JEOL Resonance Co. JNM-ECX500II
Sample tube: 3.2 mmϕ
Sample volume: 150 mg
Measurement temperature: Room temperature
Pulse mode: CP/MAS
Measurement nuclear frequency: 123.25 MHz ($^{13}$C)
Standard substance: Adamantane (external standard: 29.5 ppm)
Sample rotation: 20 kHz
Contact time: 2 ms
Delay time: 2 s
Cumulative number: 1024

The peaks are separated according to the types of $P^1$, $L^1$ and $R^1$ to $R^3$ in formula (1) and the monomer unit structures represented by formulae (2) and (3) in the resin B, and identified to determine $P^1$, $L^1$ and $R^1$ to $R^3$ and the structures of formulae (2) and (3).

Method for Measuring Weight-Average Molecular Weight (Mw)

The weight-average molecular weight (Mw) of the polymer, resin or toner particle is measured as follows by gel permeation chromatography (GPC).

The sample is first dissolved in tetrahydrofuran (THF) at room temperature over the course of 24 hours. The resulting solution is then filtered with a solvent-resistant membrane filter with a pore diameter of 0.2 microns (Tosoh Corp. "Maishori Disk") to obtain a sample solution. The sample solution is prepared with a concentration of THF-soluble components of about 0.8 mass %. Measurement is performed under the following conditions using this sample solution.

Unit: HLC8120 GPC (Detector: RI) (Tosoh Corp.)
Columns: Shodex KF-801, 802, 803, 804, 805, 806, 807 (total 7, Showa Denko)
Eluent: Tetrahydrofuran (THF)
Flow rate: 1.0 mL/min
Oven temperature: 40.0° C.
Sample injection volume: 0.10 mL A molecular weight calibration curve prepared using standard polystyrene resin (product name TSK Standard Polystyrene F-850, F-450, F-288, F-128, F-80, F-40, F-20, F-10, F-4, F-2, F-1, A-5000, A-2500, A-1000, A-500, Tosoh Corp.) was used for calculating the molecular weights of the samples.

Method for Calculating SPA and SPB

The SPA and SPB are determined as follows in accordance with the calculation methods proposed by Fedors et al. For the atoms and atomic groups in each molecular structure, the evaporation energies (Δei) (cal/mol) and molar volumes (Δvi) (cm$^3$/mol) are determined from the tables given in Polym. Eng. Sci. 14 (2), 147-154 (1974), and each SP value (J/cm$^3$)$^{0.5}$ is calculated as $(4.184 \times \Sigma \Delta ei/\Sigma \Delta vi)^{0.5}$.

Specifically, the evaporation energies (Δei) and molar volumes (Δvi) of the monomer units derived from the monomers constituting the resins A and B are determined for each monomer unit and multiplied by the molar ratio (j) of each monomer unit in the resin A, and the sum of the evaporation energies of all monomer units is divided by the sum of the molar volumes as shown in formula (5) below.

$$SPA \text{ or } SPB = \{4.184 \times (\Sigma j \times \Sigma \Delta ei)/(\Sigma j \times \Sigma \Delta vi)\}^{0.5} \quad (5)$$

Method for Measuring Ion Count Derived from Silicon with a Mass Number of 28 Relative to the Total Ion Count at Mass Numbers 1 to 1,800 by TOF-SIMS Measurement The ion count derived from silicon with a mass number of 28 relative to the total ion count at mass numbers 1 to 1,800 in measurement of the toner particle surface by time-of-flight secondary ion mass spectrometry (TOF-SIMS) is obtained with the following equipment under the following measurement conditions.

Measurement Equipment: TOF-SIMS TRIFT IV (Ulvac-Phi)
Primary ion species: Gold ions (Au$^+$)
Primary ion acceleration voltage: 30 keV
Primary ion current value: 2 pA
Analysis area: 300×300 μm$^2$
Pixels: 256×256 pixels
Analysis time: 3 min
Repeating frequency: 8.2 kHz
Charge neutralization: on Analysis is performed with Ulvac-Phi standard software (Win Cadense) in the secondary ion mass range (m/z) of 0.5 to 1,850 of ions with a positive polarity. The ion count derived from silicon with a mass number of 28 is calculated as the intensity ratio of the ion count derived from silicon with a mass number of 28 relative to the total ion count at mass numbers 1 to 1,850.

Method for Measuring Weight-Average Particle Diameters (D4) of Toner Particle and Toner The weight-average particle diameters (D4) of the toner particle and toner are measured with a Multisizer 3 Coulter Counter® precision particle size measurement apparatus (Beckman Coulter). Measurement is performed under the following conditions.

Effective Measurement Channels: 25,000 Channels
Total control motors: 50,000
Aperture: 100 μm
Current: 1,600 μA
Gain: 2

Measurement is performed with a Kd value obtained using "Standard particles 10.0 μm" (Beckman Coulter). The measurement data are analyzed using the dedicated software included with the apparatus to calculate the weight-average particle diameter (D4). The weight-average particle diameter (D4) is the "average diameter" on the "Analysis/volume statistics (arithmetic average)" screen when the dedicated software is set to graph/vol %.

Method for Measuring Content of Structure Represented by Formula (4) in Resin A

The content of the structure represented by formula (4) in the resin A is measured using an Axios wavelength dispersive fluorescent X-ray analyzer (PANalytical Co.) together with the attached SuperQ ver. 4.0 F dedicated software (PANalytical Co.) for setting the measurement conditions and analyzing the measurement data. Rh is used for the anode of the X-ray tube and vacuum as the measurement atmosphere, with a measurement diameter (collimator mask diameter) of 27 mm and a measurement time of 10 seconds. Detection is performed using a proportional counter (PC) when measuring light elements and a scintillation counter (SC) when measuring heavy elements.

For the measurement sample, 4 g of the resin A or a tetrahydrofuran-soluble component obtained by separating the resin A from the toner particle is placed in a dedicated aluminum pressing ring, spread flat, and pressed for 60 seconds at 20 MPa with a BRE-32 tablet molding compressor (Maekawa Testing Machine) to obtain a pellet molded to a thickness of 2 mm and a diameter of 39 mm.

0.5 mass parts of an $SiO_2$ particle (hydrophobic fumed silica, product name Aerosil NAX50, specific surface area 40±10 $m^2$/g, carbon content 0.45% to 0.85%, manufactured by Nippon Aerosil) are also added to 100 mass parts of a binder particle (product name: Spectro Blend, composed of 81.0 mass % C, 2.9 mass % O, 13.5 mass % H and 2.6 mass % N, chemical formula $C_{19}H_{38}ON$, shape: powder (44 μm), manufactured by Rigaku), and thoroughly mixed in a coffee mill. 5.0 parts of the same $SiO_2$ particle are also mixed in the same way with 10.0 parts of the same binder particle, and these are used as samples for the calibration curve.

A tablet molding compressor is used to prepare pellets for the calibration curve as described above from each sample, and the count rate (unit: cps) of Si-Kα rays measured at a diffraction angle (2θ) of 109.08° with a PET diffraction crystal is measured. The acceleration voltage and current value of the X-ray generator are 24 kV and 100 mA, respectively. The resulting X-ray count rate is plotted on the vertical axis and the added amount of $SiO_2$ particles in each calibration curve sample on the horizontal axis to obtain a calibration curve of linear function.

Next, the resin A under analysis or the tetrahydrofuran-soluble component obtained by separating the resin A from the toner particle is molded into a pellet as described above with a tablet molding compressor, and the count rate of Si-Kα rays is measured. The content of silicon atoms is then determined from the calibration curve. The content of the structure represented by formula (4) can then be determined from the resulting content of silicon atoms and the structure of the resin A obtained by the above method for confirming the structure of the resin A.

EXAMPLES

The disclosures are explained in detail below using examples, but the disclosures are not limited by these examples. "Parts" of the various materials in the examples and comparative examples are based on mass unless otherwise specified.

Manufacturing Resin S1

A resin S1 was manufactured by the following procedures.

The following materials were loaded into an autoclave equipped with a decompression device, a moisture separator, a nitrogen gas introduction device, a temperature measurement device, and a stirring device and reacted at 200° C. at normal pressure in a nitrogen atmosphere, and once the desired molecular weight had been reached this was cooled to stop the reaction.
Bisphenol A propylene oxide 2-mol adduct: 71.3 pts
Terephthalic acid: 14.0 pts
Isophthalic acid: 14.0 pts
Tetrabutoxy titanate: 0.1 pts
Trimellitic acid: 0.9 pts
This was then reacted for 2 hours at reduced pressure of 10 mmHg to 20 mmHg to obtain a resin S1. The weight-average molecular weight (Mw) of the resulting resin S1 was 19,000.

Manufacturing Resins S2 to S6

Resins S2 to S6 were manufactured in the same way as the resin S1 except that the alcohol component and acid component were changed as shown in Table 1, and the reaction time was changed appropriately according to the desired molecular weight.

TABLE 1

|  | Alcohol component | | Acid component 1 | | Acid component 2 | | Acid component 3 | | Mw |
| --- | --- | --- | --- | --- | --- | --- | --- | --- | --- |
|  | Type | Parts | Type | Parts | Type | Parts | Type | Parts |  |
| Resin S1 | BPA-PO 2 mol | 71.3 | TPA | 14.0 | IPA | 14.0 | TMA | 0.9 | 19000 |
| Resin S2 | BPA-PO 2 mol | 71.3 | TPA | 14.0 | IPA | 14.0 | Maleic acid | 1.0 | 18500 |
| Resin S3 | BPA-PO 2 mol | 71.3 | TPA | 13.0 | IPA | 13.0 | TMA | 1.2 | 49000 |
| Resin S4 | BPA-PO 2 mol | 71.3 | TPA | 14.5 | IPA | 14.5 | — | — | 7500 |
| Resin S5 | BPA-PO 2 mol | 71.3 | TPA | 13.0 | IPA | 13.0 | TMA | 1.2 | 60000 |
| Resin S6 | BPA-PO 2 mol | 71.3 | TPA | 14.5 | IPA | 14.5 | — | — | 5800 |

In Table 1, BPA-PO 2 mol represents bisphenol A propylene oxide 2 mol adduct, TPA is terephthalic acid, IPA is isophthalic acid and TMA is trimellitic acid.

Manufacturing Resin V1

A resin V1 was manufactured by the following procedures.

100.0 parts of propylene glycol monomethyl ether were heated under nitrogen purging, and refluxed at a liquid temperature of at least 120° C. A mixture of 97.0 parts of styrene and 3.0 parts of methacrylic acid as polymerizable monomers and 0.50 parts of tert-butyl peroxybenzoate (Perbutyl® Z, NOF Corp.) as a polymerization initiator was then dripped in over the course of 3 hours.

After completion of dripping, the solution was stirred for 3 hours, and distilled at normal pressure as the liquid temperature was raised to 170° C. Once the liquid temperature had reached 170° C., the pressure was lowered to 1 hPa, and the solvent was removed by distillation for 1 hour to obtain a resin solid. The resin solid was dissolved in tetrahydrofuran and reprecipitated with n-hexane, and the precipitated solid was filtered out to obtain a resin V1. The weight-average molecular weight (Mw) of the resulting resin V1 was 24,500.

Manufacturing Resins V2 to V6

Resins V2 to V6 were manufactured in the same way as the resin V1 except that the polymerizable monomers were changed as shown in Table 2.

TABLE 2

| Resin V | Monomer 1 Type | Parts | Monomer 2 Type | Parts | Mw |
|---|---|---|---|---|---|
| Resin V1 | Styrene | 97.0 | Methacrylic acid | 3.0 | 24500 |
| Resin V2 | Styrene | 97.0 | 2-hydroxyethyl methacrylate | 3.0 | 24000 |
| Resin V3 | Styrene | 98.2 | 2-isocyanatoethyl methacrylate | 1.8 | 24500 |
| Resin V4 | Styrene | 92.0 | Methacrylic acid | 8.0 | 23500 |
| Resin V5 | Styrene | 98.0 | Methacrylic acid | 2.0 | 25000 |
| Resin V6 | Styrene | 90.0 | Methacrylic acid | 10.0 | 23000 |

Manufacturing Example of Resin A1

A resin A1 was manufactured by the following procedures.

100.0 parts of the resin S1 were dissolved in 400.00 parts of N,N-dimethylacetamide, 1.6 parts of 3-aminopropyl trimethoxysilane as a silane compound, 3.0 parts of triethylamine and 2.4 parts of DMT-MM [4-(4,6-dimethoxy-1,3,5-triazine-2-yl)-4-methylmorpholinium chloride] as a condensing agent were added, and the mixture was stirred at room temperature for 5 hours.

After completion of the reaction, the solution was dripped into methanol, reprecipitated, and filtered to obtain a resin A1. The resin A1 had a weight-average molecular weight MwA of 20,000. The physical properties of the resulting resin A1 are shown in Table 4.

Manufacturing Examples of Resins A2, A4 and A7 to A14

Resins A2, A4 and A7 to A14 were manufactured as in the manufacturing example of the resin A1 except that the base resin, the type and added amount of the silane compound and the added amount of DMT-MM were changed as shown in Table 3. The structures and physical properties of the resulting resins A2, A4 and A7 to A14 are shown in Table 4.

TABLE 3

| Resin A | Base Resin | Silane compound Type | Parts | Condensing agent (DMT-MM) Parts |
|---|---|---|---|---|
| Resin A1 | Resin S1 | 3-aminopropyl trimethoxysilane | 1.6 | 2.4 |
| Resin A2 | Resin V1 | 3-aminopropyl trimethoxysilane | 2.0 | 3.0 |
| Resin A4 | Resin V3 | 3-aminopropyl trimethoxysilane | 2.0 | 3.0 |
| Resin A7 | Resin V4 | 3-aminopropyl trimethoxysilane | 11.2 | 16.8 |
| Resin A8 | Resin V5 | 3-aminopropyl trimethoxysilane | 0.5 | 0.8 |
| Resin A9 | Resin V6 | 3-aminopropyl trimethoxysilane | 16.0 | 24.0 |
| Resin A10 | Resin V5 | 3-aminopropyl trimethoxysilane | 0.3 | 0.5 |

TABLE 3-continued

| Resin A | Base Resin | Silane compound Type | Parts | Condensing agent (DMT-MM) Parts |
|---|---|---|---|---|
| Resin A11 | Resin S3 | 3-aminopropyl trimethoxysilane | 1.5 | 2.3 |
| Resin A12 | Resin S4 | 3-aminopropyl trimethoxysilane | 1.5 | 2.3 |
| Resin A13 | Resin S5 | 3-aminopropyl trimethoxysilane | 1.5 | 2.3 |
| Resin A14 | Resin S6 | 3-aminopropyl trimethoxysilane | 1.5 | 2.3 |

Manufacturing Example of Resin A3

A resin A3 was manufactured by the following procedures.

100.0 parts of the resin V2 were dissolved in 500.00 parts of chloroform, 2.0 parts of 3-isocyanatopropyl trimethoxysilane and 0.50 parts of titanium (IV) tetraisopropoxide were added in a nitrogen atmosphere, and the mixture was stirred for 5 hours at room temperature. After completion of the reaction, the solution was dripped into methanol, reprecipitated, and filtered to obtain a resin A3. The structure and physical properties of the resin A3 are shown in Table 4.

Manufacturing Example of Resin A5

A resin A5 was obtained as in the manufacturing example of the resin V1 except that the methacrylic acid was replaced with 3-methacryloxypropyl trimethoxysilane. The structure and physical properties of the resin A5 are shown in Table 4.

Manufacturing Example of Resin A6

100.0 parts of the resin S2 were dissolved in 1,000.0 parts of toluene, 2.5 parts of 3-methacryloxypropyl trimethoxysilane and 0.6 parts of tert-butyl peroxybenzoate (NOF Corp. Perbutyl® Z) were added in a nitrogen atmosphere, and the mixture was reacted for 5 hours at 100° C. The resulting solution was reprecipitated in methanol, filtered washed, and then vacuum dried to obtain a resin A6. The structure and physical properties of the resin A6 are shown in Table 4.

Manufacturing Example of Resin A15

A resin A15 was obtained as in the manufacturing example of the resin V1 except that the 97.0 parts of styrene were replaced with 98.0 parts of styrene and the 3.0 parts of methacrylic acid with 2.0 parts of vinyl triethoxysilane. The structure and physical properties of the resin A15 are shown in Table 4.

Manufacturing Example of Resin A16

400.0 parts of pure water were mixed and stirred with a solution of 10.0 parts of the resin A2 dissolved in 90.0 parts of toluene, the pH was adjusted to 4.0 with dilute hydrochloric acid, and the mixture was stirred for 10.8 hours at room temperature, after which stirring was stopped and the mixture was transferred to a separation funnel to extract the oil phase. The oil phase was concentrated and reprecipitated in methanol to obtain a resin A16. When the resulting resin A16 was analyzed by $^{29}$Si-NMR (solid) measurement, $R^1$ to $R^3$ in formula (1) were all hydroxy groups. The structure and physical properties of the resin A16 are shown in Table 4.

TABLE 4

| | Structure | | | | Physical properties SPA $[(J/m^3)^{0.5}]$ | MwA | Content of formula (4) structure (mass %) |
|---|---|---|---|---|---|---|---|
| | $R^1$ | $R^2$ | $R^3$ | $L^1$ | | | |
| Resin A1 | —OCH$_3$ | —OCH$_3$ | —OCH$_3$ | —NH—(CH$_2$)$_3$— | 21.29 | 20000 | 1.6 |
| Resin A2 | —OCH$_3$ | —OCH$_3$ | —OCH$_3$ | —NH—(CH$_2$)$_3$— | 20.19 | 25000 | 2.0 |
| Resin A3 | —OCH$_3$ | —OCH$_3$ | —OCH$_3$ | —NH—(CH$_2$)$_3$— | 20.19 | 25000 | 2.0 |

TABLE 4-continued

| | Structure | | | | Physical properties | | |
| --- | --- | --- | --- | --- | --- | --- | --- |
| | | | | | SPA | | Content of formula (4) structure |
| | $R^1$ | $R^2$ | $R^3$ | $L^1$ | $[(J/m^3)^{0.5}]$ | MwA | (mass %) |
| Resin A4 | —OCH$_3$ | —OCH$_3$ | —OCH$_3$ | —NH—(CH$_2$)$_3$— | 20.18 | 25000 | 2.0 |
| Resin A5 | —OCH$_3$ | —OCH$_3$ | —OCH$_3$ | —O(CH$_2$)$_3$— | 20.08 | 25000 | 3.0 |
| Resin A6 | —OCH$_3$ | —OCH$_3$ | —OCH$_3$ | —O(CH$_2$)$_3$— | 21.38 | 20000 | 2.5 |
| Resin A7 | —OCH$_3$ | —OCH$_3$ | —OCH$_3$ | —NH—(CH$_2$)$_3$— | 20.19 | 25000 | 10.1 |
| Resin A8 | —OCH$_3$ | —OCH$_3$ | —OCH$_3$ | —NH—(CH$_2$)$_3$— | 20.18 | 25000 | 0.5 |
| Resin A9 | —OCH$_3$ | —OCH$_3$ | —OCH$_3$ | —NH—(CH$_2$)$_3$— | 20.17 | 25000 | 13.8 |
| Resin A10 | —OCH$_3$ | —OCH$_3$ | —OCH$_3$ | —NH—(CH$_2$)$_3$— | 20.18 | 25000 | 0.3 |
| Resin A11 | —OCH$_3$ | —OCH$_3$ | —OCH$_3$ | —NH—(CH$_2$)$_3$— | 21.23 | 50000 | 1.5 |
| Resin A12 | —OCH$_3$ | —OCH$_3$ | —OCH$_3$ | —NH—(CH$_2$)$_3$— | 21.29 | 8000 | 1.5 |
| Resin A13 | —OCH$_3$ | —OCH$_3$ | —OCH$_3$ | —NH—(CH$_2$)$_3$— | 21.23 | 60000 | 1.5 |
| Resin A14 | —OCH$_3$ | —OCH$_3$ | —OCH$_3$ | —NH—(CH$_2$)$_3$— | 21.29 | 6000 | 1.5 |
| Resin A15 | —OCH$_2$CH$_3$ | —OCH$_2$CH$_3$ | —OCH$_2$CH$_3$ | — | 20.10 | 35000 | 2.0 |
| Resin A16 | —OH | —OH | —OH | —NH—(CH$_2$)$_3$— | 21.29 | 21000 | 2.5 |
| Resin A17 | —OCH$_3$ | —OCH$_3$ | —OCH$_3$ | —O(CH$_2$)$_3$— | 20.08 | 5000 | 1.5 |
| Resin A18 | —OCH$_3$ | —OCH$_3$ | —OCH$_3$ | —O(CH$_2$)$_6$— | 20.09 | 5000 | 2.0 |
| Resin A19 | —OCH$_3$ | —OCH$_3$ | —OCH$_3$ | —O(CH$_2$)$_3$— | 21.21 | 5000 | 1.5 |
| Resin A20 | —OCH$_3$ | —OCH$_3$ | —OCH$_3$ | —O(CH$_2$)$_3$— | 20.10 | 8000 | 0.8 |
| Resin A21 | —OCH$_3$ | —OCH$_3$ | —OCH$_3$ | —O(CH$_2$)$_3$— | 20.08 | 7000 | 3.0 |
| Resin A22 | —OCH$_3$ | —OCH$_3$ | —OCH$_3$ | —O(CH$_2$)$_3$— | 20.10 | 10000 | 0.7 |
| Resin A23 | —OCH$_3$ | —OCH$_3$ | —OCH$_3$ | —O(CH$_2$)$_3$— | 20.07 | 5000 | 5.0 |

The manufacturing examples of the resins A17 to A23 are described below.

Manufacturing Example of Toner Particle 1

390.0 parts of deionized water and 14.0 parts of sodium phosphate (12-hydrate) (Rasa Industries) were added to a reactor and kept warm at 65° C. for 1 hour under nitrogen purging. This was then stirred at 12,000 rpm with a T.K. Homomixer (Tokushu Kika) as a calcium chloride solution of 9.2 parts of calcium chloride (dihydrate) dissolved in 10.0 parts of deionized water was added all at once to prepare an aqueous medium comprising a dispersion stabilizer. Hydrochloric acid was further added to adjust the pH of the aqueous medium to 6.0 and obtain an aqueous medium 1.

The following materials were then mixed.

| | |
| --- | --- |
| Behenyl acrylate | 60.0 pts |
| Methacrylonitrile | 30.0 pts |
| Styrene | 10.0 pts |
| Resin A1 | 2.0 pts |
| Wax (Fischer-Tropsch wax, melting point 78° C.) | 9.0 pts |
| C.I. Pigment Blue 15:3 | 6.0 pts |

This was maintained at 65° C. and uniformly dissolved and dispersed at 500 rpm with a T.K. Homomixer to prepare a polymerizable monomer composition 1. With the temperature of the aqueous medium 1 maintained at 70° C. and the rotation of the stirring apparatus at 12,000 rpm, the polymerizable monomer composition 1 was added to the aqueous medium 1, and 8.0 parts of t-butyl peroxypivalate were added as a polymerization initiator. This was then granulated for 10 minutes in the stirring apparatus with the rotation maintained at 12,000 rpm.

The stirring apparatus was replaced with a stirrer having a propeller blade, and polymerization was performed for 5 hours under stirring at 150 rpm with the temperature maintained at 70° C., after which the temperature was raised to 85° C. and maintained for two hours, and the mixture was then cooled to room temperature to obtain a toner particle dispersion 1. Hydrochloric acid was added to the resulting toner particle dispersion 1 to lower the pH to 1.4 or less and dissolve the dispersion stabilizer, and the mixture was filtered, washed, and dried to obtain a toner particle 1. The physical properties of the resin B1 in the toner particle 1 are shown in Table 5. The physical properties of the toner particle 1 are shown in Table 8.

Manufacturing Examples of Toner Particles 2 to 31 and 34 to 36 and Comparative Toner Particles 1 to 4

Toner particles 2 to 31 and 34 to 36 and comparative toner particles 1 to 4 were manufactured as in the manufacturing example of the toner particle 1 except that the types and amounts of the raw materials were changed as shown in Table 6. The physical properties of the resins B1 to B17 of the toner particles 2 to 31 and 34 to 36 and the comparative toner particles 1 to 4 are shown in Table 8.

TABLE 5

| | Structure | Physical properties | |
| --- | --- | --- | --- |
| Resin B | n in formula (2) | SPB $[(J/m^3)^{0.5}]$ | MwB |
| Resin B1 | 21 | 20.61 | 55000 |
| Resin B2 | 21 | 20.46 | 50000 |
| Resin B3 | 21 | 19.14 | 55000 |
| Resin B4 | 21 | 21.10 | 55000 |
| Resin B5 | 21 | 19.41 | 50000 |
| Resin B6 | 21 | 19.15 | 50000 |
| Resin B7 | 21 | 21.53 | 50000 |
| Resin B8 | 21 | 20.46 | 99000 |
| Resin B9 | 21 | 20.46 | 15000 |
| Resin B10 | 21 | 20.46 | 130000 |
| Resin B11 | 21 | 20.46 | 10000 |
| Resin B12 | 27 | 20.51 | 55000 |
| Resin B13 | 17 | 21.07 | 55000 |
| Resin B14 | 11 | 19.60 | 55000 |
| Resin B15 | 21 | 20.28 | 50000 |
| Resin B16 | 21 | 18.60 | 55000 |
| Resin B17 | 7 | 21.10 | 55000 |
| Resin B18 | 21 | 20.60 | 50000 |

TABLE 6

| | Toner particle composition | | | | | | | | | | |
|---|---|---|---|---|---|---|---|---|---|---|---|
| | Resin B | | | | | | | Resin A | | | |
| | Resin B No. | Monomer 1 | | Monomer 2 | | Monomer 3 | | Resin A No. | Parts | Polymerization initiator | MA/MB |
| | | Type | Parts | Type | Parts | Type | Parts | | | | |
| Toner particle 1 | Resin B1 | BHA | 60.0 | MN | 30.0 | Styrene | 10.0 | Resin A1 | 2.0 parts | 8.0 parts | 0.0200 |
| Toner particle 2 | Resin B1 | BHA | 60.0 | MN | 30.0 | Styrene | 10.0 | Resin A2 | 2.0 parts | 8.0 parts | 0.0200 |
| Toner particle 3 | Resin B2 | BHA | 10.0 | MN | 10.0 | Styrene | 80.0 | Resin A1 | 2.0 parts | 8.0 parts | 0.0200 |
| Toner particle 4 | Resin B2 | BHA | 10.0 | MN | 10.0 | Styrene | 80.0 | Resin A2 | 2.0 parts | 8.0 parts | 0.0200 |
| Toner particle 5 | Resin B1 | BHA | 60.0 | MN | 30.0 | Styrene | 10.0 | Resin A1 | 2.0 parts | 8.0 parts | 0.0200 |
| Toner particle 6 | Resin B3 | BHA | 50.0 | Styrene | 40.0 | nBA | 10.0 | Resin A2 | 2.0 parts | 8.0 parts | 0.0200 |
| Toner particle 7 | Resin B1 | BHA | 60.0 | MN | 30.0 | Styrene | 10.0 | Resin A3 | 2.0 parts | 8.0 parts | 0.0200 |
| Toner particle 8 | Resin B1 | BHA | 60.0 | MN | 30.0 | Styrene | 10.0 | Resin A4 | 2.0 parts | 8.0 parts | 0.0200 |
| Toner particle 9 | Resin B1 | BHA | 60.0 | MN | 30.0 | Styrene | 10.0 | Resin A5 | 2.0 parts | 8.0 parts | 0.0200 |
| Toner particle 10 | Resin B1 | BHA | 60.0 | MN | 30.0 | Styrene | 10.0 | Resin A6 | 2.0 parts | 8.0 parts | 0.0200 |
| Toner particle 11 | Resin B4 | BHA | 60.0 | AN | 25.0 | Styrene | 15.0 | Resin A7 | 2.0 parts | 8.0 parts | 0.0200 |
| Toner particle 12 | Resin B4 | BHA | 60.0 | AN | 25.0 | Styrene | 15.0 | Resin A8 | 2.0 parts | 8.0 parts | 0.0200 |
| Toner particle 13 | Resin B1 | BHA | 60.0 | MN | 30.0 | Styrene | 10.0 | Resin A9 | 2.0 parts | 8.0 parts | 0.0200 |
| Toner particle 14 | Resin B1 | BHA | 60.0 | MN | 30.0 | Styrene | 10.0 | Resin A10 | 2.0 parts | 8.0 parts | 0.0200 |
| Toner particle 15 | Resin B5 | BHA | 60.0 | MN | 8.0 | Styrene | 32.0 | Resin A1 | 2.0 parts | 8.0 parts | 0.0200 |
| Toner particle 16 | Resin B6 | BHA | 80.0 | MN | 10.0 | Styrene | 10.0 | Resin A1 | 2.0 parts | 8.0 parts | 0.0200 |
| Toner particle 17 | Resin B1 | BHA | 60.0 | MN | 30.0 | Styrene | 10.0 | Resin A4 | 20.0 parts | 8.0 parts | 0.2000 |
| Toner particle 18 | Resin B1 | BHA | 60.0 | MN | 30.0 | Styrene | 10.0 | Resin A4 | 0.5 parts | 8.0 parts | 0.0050 |
| Toner particle 19 | Resin B1 | BHA | 60.0 | MN | 30.0 | Styrene | 10.0 | Resin A4 | 23.0 parts | 8.0 parts | 0.2300 |
| Toner particle 20 | Resin B1 | BHA | 60.0 | MN | 30.0 | Styrene | 10.0 | Resin A4 | 0.3 parts | 8.0 parts | 0.0030 |
| Toner particle 21 | Resin B7 | BHA | 60.0 | AN | 30.0 | Styrene | 10.0 | Resin A11 | 2.0 parts | 8.0 parts | 0.0200 |
| Toner particle 22 | Resin B7 | BHA | 60.0 | AN | 30.0 | Styrene | 10.0 | Resin A12 | 2.0 parts | 8.0 parts | 0.0200 |
| Toner particle 23 | Resin B7 | BHA | 60.0 | AN | 30.0 | Styrene | 10.0 | Resin A13 | 2.0 parts | 8.0 parts | 0.0200 |
| Toner particle 24 | Resin B7 | BHA | 60.0 | AN | 30.0 | Styrene | 10.0 | Resin A14 | 2.0 parts | 8.0 parts | 0.0200 |
| Toner particle 25 | Resin B8 | BHA | 10.0 | MN | 10.0 | Styrene | 80.0 | Resin A2 | 2.0 parts | 5.0 parts | 0.0200 |
| Toner particle 26 | Resin B9 | BHA | 10.0 | MN | 10.0 | Styrene | 80.0 | Resin A2 | 2.0 parts | 14.0 parts | 0.0200 |
| Toner particle 27 | Resin B10 | BHA | 10.0 | MN | 10.0 | Styrene | 80.0 | Resin A2 | 2.0 parts | 2.5 parts | 0.0200 |
| Toner particle 28 | Resin B11 | BHA | 10.0 | MN | 10.0 | Styrene | 80.0 | Resin A2 | 2.0 parts | 16.0 parts | 0.0200 |
| Toner particle 29 | Resin B12 | OCA | 60.0 | MN | 30.0 | Styrene | 10.0 | Resin A1 | 2.0 parts | 8.0 parts | 0.0200 |
| Toner particle 30 | Resin B13 | STA | 55.0 | MN | 35.0 | Styrene | 10.0 | Resin A1 | 2.0 parts | 8.0 parts | 0.0200 |
| Toner particle 31 | Resin B14 | LA | 10.0 | MN | 10.0 | Styrene | 80.0 | Resin A1 | 2.0 parts | 8.0 parts | 0.0200 |
| Toner particle 34 | Resin B15 | BHA | 5.0 | MN | 5.0 | Styrene | 90.0 | Resin A2 | 2.0 parts | 8.0 parts | 0.0200 |
| Toner particle 35 | Resin B16 | BHA | 95.0 | MN | 5.0 | — | — | Resin A2 | 2.0 parts | 8.0 parts | 0.0200 |
| Toner particle 36 | Resin B1 | BHA | 60.0 | MN | 30.0 | Styrene | 10.0 | Resin A16 | 2.0 parts | 8.0 parts | 0.0200 |
| Comparative toner particle 1 | Resin B3 | BHA | 50.0 | Styrene | 40.0 | nBA | 10.0 | Resin A15 | 2.0 parts | 8.0 parts | 0.0200 |
| Comparative toner particle 2 | Resin B3 | BHA | 50.0 | Styrene | 40.0 | nBA | 10.0 | — | — | — | — |
| Comparative toner particle 3 | Resin B17 | MN | 20.0 | Styrene | 60.0 | OA | 20.0 | Resin A5 | 2.0 parts | 8.0 parts | 0.0200 |
| Comparative toner particle 4 | — | Styrene | 80.0 | nBA | 20.0 | — | — | Resin A5 | 2.0 parts | 8.0 parts | — |

In Table 6, BHA represents behenyl acrylate, OCA is octacosyl acrylatre, STA is stearyl acrylate, LA is lauryl acrylate, OA is octyl acrylate, nBA is n-butyl acrylate, MN is methacrylonitrile and AN is acrylonitrile.

Manufacturing Example of Toner Particle 32
Manufacturing Resin B18

| | |
|---|---|
| Behenyl acrylate | 60.0 pts |
| Methacrylonitrile | 30.0 pts |
| Styrene | 10.0 pts |
| Toluene | 100.0 pts |

These materials were mixed and heated to 70° C., and 1.0 part of t-butyl peroxypivalate was added under stirring as a polymerization initiator. Polymerization was then performed for 5 hours with the temperature maintained at 70° C., after which the temperature was further raised to 85° C. and heating was maintained for 2 hours. This was cooled, reprecipitated in methanol, and filtered and dried to obtain a resin B18. The physical properties of the resulting resin B18 are shown in Table 5.

| | |
|---|---|
| Resin B18 | 100.0 pts |
| C.I. Pigment Blue 15:3 | 7.0 pts |
| Resin A2 | 2.0 pts |
| Paraffin wax (DSC peak temperature 80° C.) | 5.0 pts |

These materials were mixed in a Henschel Mixer (FM-75, Mitsui Miike), and kneaded in a 2-axis extruder (Ikegai Corp. PCM-30) at a rotation of 3.3 s$^{-1}$ and a kneading temperature of 120° C. The kneaded product was cooled and crushed to 1 mm or less in a hammer mill to obtain a crushed product. Then crushed product was then finely pulverized in a mechanical pulverizer (Turbo Industries T-250). The resulting fine powder was classified with a multi-division classifier using the Coanda effect to obtain a toner particle 32 with a weight-average particle diameter of 6.1 μm. The resulting toner particle 32 had an MA/MB of 0.0200.

Manufacturing Example of Toner Particle 33
Manufacturing Dispersion of Resin B18 Fine Particle 60 parts of the resin B18 were added to 200 g of toluene (Wako Pure Chemical), heated to 90° C., and dissolved under stirring for 3 hours. 6 parts of an anionic surfactant (Daiichi Kogyo: Neogen RK) and 3 parts of another anionic surfactant (NOF: Nonsoul LN1) dissolved in 180 parts of deionized water were added to the toluene solution of the dissolved resin B18. This was then thoroughly stirred at 4,000 rpm with a T.K. Robomix (Primix) ultra-high speed stirring apparatus. This was then dispersed for about 1 hour with a high-pressure impact disperser Nanomizer (Yoshida Kikai), and the toluene was removed with an evaporator to obtain a dispersion of the B18 resin fine particle.

Manufacturing Dispersion of Resin A2

A dispersion of the resin A2 was obtained in the same way as the resin B18 fine particle dispersion except that the resin B18 was replaced with the resin A2.

Manufacturing Dispersion of Release Agent Fine Particle

| | |
|---|---|
| Release agent (HNP-51, melting point 78° C., Nippon Seiro) | 20.0 pts |
| Anionic surfactant (Daiichi Kogyo: Neogen RK) | 1.0 pts |
| Deionized water | 79.0 pts |

This formulation was placed in a mixing container equipped with a stirring apparatus, heated to 90° C., circulated to a Clearmix W-Motion (M-Technique) while being stirred and dispersion treated for 60 minutes at a rotor speed of 19,000 rpm and a screen rotation of 19,000 rpm in a shear agitation site with an external rotor diameter of 3 cm and a clearance of 0.3 mm, and then cooled to 40° C. under cooling conditions of rotor speed 1,000 rpm, screen rotation 0 rpm, cooling rate 10° C./min to obtain a dispersion of a release agent fine particle.

Manufacturing Pigment Dispersion

| | |
|---|---|
| C.I. Pigment Blue 15:3 | 10.0 pts |
| Deionized water | 78.0 pts |
| Anionic surfactant (Daiichi Kogyo: Neogen RK) | 2.0 pts |

These materials were mixed and then dispersed for 1 hour with a high-pressure impact disperser Nanomizer (Yoshida Kikai) to prepare a pigment dispersion.

| | |
|---|---|
| Resin B18 fine particle dispersion (solids 28%) | 320.0 pts |
| Pigment dispersion (solids 11%) | 50.0 pts |
| Release agent particle dispersion (solids 20%) | 50.0 pts |
| Resin A2 dispersion (solids 28%) | 3.2 pts |

These materials were placed in a round stainless-steel flask, and mixed. An aqueous solution of 8 parts of magnesium sulfate dissolved in 98.0 parts of deionized water was then added and dispersed for 10 minutes at 5,000 rpm with a Homogenizer (IKA Ultra-Turrax T50). This was then heated to 50° C. in a heating water bath using a stirring blade with the rotation adjusted appropriately so as to stir the mixture. This was maintained for 1 hour at 50° C., and the weight-average particle diameter of the formed aggregate particles was measured. It was thus confirmed that aggregate particles with a weight-average particle diameter of about 6.0 µm had formed.

An aqueous solution of 40 parts of ethylene diamine sodium tetraacetate dissolved in 360 parts of deionized water was added to the resulting dispersion of aggregate particles, and a further 2,800 parts of deionized water were added. The mixture was heated to 80° C. under stirring and then maintained in a sealed state for 2 hours to obtain thoroughly fused particles. This was then filtered and subjected to solid-liquid separation, and the filtrate was thoroughly washed with deionized water and dried with a vacuum drier to obtain a toner particle 33 with a weight-average particle diameter of 5.8 µm. The resulting toner particle 33 had an MA/MB of 0.0100.

Manufacturing Example of Toner Particle 37

98.5 parts of styrene and 1.5 parts of 3-methacryloxypropyl trimethoxysilane (MPTMS) were mixed with a stirrer until a uniform phase was reached to obtain a monomer solution 1. 50 parts of deionized water were then measured and added to 50 parts of the monomer solution 1, which was then dispersed for 1 minute at 97% force, 25° C. with an ultrasound homogenizer (Sonic & Material) to obtain a monomer suspension 1.

A toner base particle dispersion 37 was obtained as in the manufacturing example of the toner particle 1 except that no resin A1 was added, the steps from addition of hydrochloric acid to drying were omitted, and the solids concentration of the toner particle dispersion was adjusted to 20.0 mass % by addition of deionized water followed by decantation and filtration.

500 parts of the resulting toner base particle dispersion 37 were placed in a reactor equipped with a stirrer and stirred while being heated to 70° C., and nitrogen purging was performed for 1 hour. 2.0 parts of the monomer suspension 1 and 0.1 part of potassium persulfate (KPS) were added to the reactor, and a reaction was performed for 3 hours at 70° C. to form the resin A17 on the toner base particle surface. This was cooled to room temperature, after which hydrochloric acid was added to adjust the pH to 1.4 or less and stirring was continued for 1 hour. Filtration, washing, and drying were then performed as in the manufacturing example of the toner particle 1 to obtain a toner particle 37. The physical properties of the resulting toner particle 37 are shown in Table 8.

Manufacturing Examples of Toner Particles 38 to 44

Toner particles 38 to 44 were manufactured as in the manufacturing example of the toner particle 37 except that the resin B composition, the monomer solution composition, and the added parts of the monomer suspension were changed as shown in Tables 7-1 and 7-2. The physical properties of the resulting toner particles 38 to 44 are shown in Table 8.

Manufacturing Example of Toner Particle 45

A toner base particle dispersion 45 was obtained as in the manufacturing example of the toner particle 33 except that no resin A2 dispersion was added, the steps of filtering, washing, and drying the fused particles were omitted, and the solids concentration of the toner particle dispersion was adjusted to 20.0 mass % by addition of deionized water to the fused particles followed by decantation and filtration. A toner particle 45 was then obtained as in the manufacturing example of the toner particle 37 except that the toner base particle dispersion 45 was used instead of the toner base particle dispersion 37. The physical properties of the resulting toner particle 45 are shown in Table 8.

Manufacturing Example of Toner Particle 46

A toner base particle 46 was obtained as in the manufacturing example of the toner particle 32 except that no resin A2 was added.

100 mass parts of the toner base particle 46 and 1.0 mass part of Contaminon N were measured and added to 400 mass parts of deionized water, and this was dispersed with an ultrasound disperser to obtain a toner base particle dispersion 46. A toner particle 46 was then obtained as in the manufacturing example of the toner particle 37 except that the toner base particle dispersion 46 was substituted for the toner base particle dispersion 37, and the monomer solution was changed as shown in Table 7-2. The physical properties of the resulting toner 46 are shown in Table 8.

TABLE 7-1

| | | | Toner base particle | | | | | |
|---|---|---|---|---|---|---|---|---|
| | | | | Resin B | | | | |
| | | Resin B | Monomer 1 | | Monomer 2 | | Monomer 3 | |
| Toner particle No. | Toner base particle No. | No. | Type | Parts | Type | Parts | Type | Parts |
| Toner particle 37 | Toner base particle 37 | Resin B1 | BHA | 60.0 | MN | 30.0 | Styrene | 10.0 |
| Toner particle 38 | Toner base particle 38 | Resin B2 | BHA | 10.0 | MN | 10.0 | Styrene | 80.0 |
| Toner particle 39 | Toner base particle 39 | Resin B1 | BHA | 60.0 | MN | 30.0 | Styrene | 10.0 |
| Toner particle 40 | Toner base particle 40 | Resin B3 | BHA | 50.0 | Styrene | 40.0 | nBA | 10.0 |
| Toner particle 41 | Toner base particle 41 | Resin B2 | BHA | 10.0 | MN | 10.0 | Styrene | 80.0 |
| Toner particle 42 | Toner base particle 42 | Resin B2 | BHA | 10.0 | MN | 10.0 | Styrene | 80.0 |
| Toner particle 43 | Toner base particle 43 | Resin B2 | BHA | 10.0 | MN | 10.0 | Styrene | 80.0 |
| Toner particle 44 | Toner base particle 44 | Resin B2 | BHA | 10.0 | MN | 10.0 | Styrene | 80.0 |
| Toner particle 45 | Toner base particle 45 | Resin B2 | BHA | 10.0 | MN | 10.0 | Styrene | 80.0 |
| Toner particle 46 | Toner base particle 46 | Resin B1 | BHA | 60.0 | MN | 30.0 | Styrene | 10.0 |

In the Table 7-1, BHA represents behenyl acrylate, nBA is n-butyl acrylate, and MN is methacrylonitrile.

TABLE 7-2

| | | | Resin A forming step | | | | | | |
|---|---|---|---|---|---|---|---|---|---|
| | | | Monomer | Monomer solution | | | | | |
| | Toner base | Resin A | suspension | Monomer 1 | | Monomer 2 | | Monomer 3 | |
| Toner particle No. | particle parts | No. | parts | Type | Parts | Type | Parts | Type | Parts | MA/MB |
| Toner particle 37 | 100.0 parts | Resin A17 | 2.0 parts | Styrene | 98.5 parts | MPTMS | 1.5 parts | — | — | 0.0200 |
| Toner particle 38 | 100.0 parts | Resin A18 | 2.0 parts | Styrene | 98.0 parts | MOTMS | 2.0 parts | — | — | 0.0200 |
| Toner particle 39 | 100.0 parts | Resin A19 | 2.0 parts | Styrene | 78.5 parts | MPTMS | 1.5 parts | MN | 20.0 parts | 0.0200 |
| Toner particle 40 | 100.0 parts | Resin A17 | 2.0 parts | Styrene | 98.5 parts | MPTMS | 1.5 parts | — | — | 0.0200 |
| Toner particle 41 | 100.0 parts | Resin A20 | 1.6 parts | Styrene | 99.2 parts | MPTMS | 0.8 parts | — | — | 0.0160 |
| Toner particle 42 | 100.0 parts | Resin A21 | 2.0 parts | Styrene | 97.0 parts | MPTMS | 3.0 parts | — | — | 0.0200 |
| Toner particle 43 | 100.0 parts | Resin A22 | 1.6 parts | Styrene | 99.3 parts | MPTMS | 0.7 parts | — | — | 0.0160 |
| Toner particle 44 | 100.0 parts | Resin A23 | 2.0 parts | Styrene | 95.0 parts | MPTMS | 5.0 parts | — | — | 0.0200 |
| Toner particle 45 | 100.0 parts | Resin A17 | 2.0 parts | Styrene | 98.5 parts | MPTMS | 1.5 parts | — | — | 0.0200 |
| Toner particle 46 | 100.0 parts | Resin A19 | 2.0 parts | Styrene | 78.5 parts | MPTMS | 1.5 parts | MN | 20.0 parts | 0.0200 |

In the Table 7-2, MPTMS represents 3-methacryloxypropyl trimethoxysilane, MOTMS represents 8-methacryloxyoctyl trimethoxysilane, and MN represents methacrylonitrile.

TABLE 8

| | \| SPA − SPB \| [(J/m$^3$)$^{0.5}$] | * | D4 [μm] |
|---|---|---|---|
| Toner particle 1 | 0.69 | 0.0023 | 5.8 |
| Toner particle 2 | 0.42 | 0.0022 | 6.4 |
| Toner particle 3 | 0.83 | 0.0022 | 5.9 |
| Toner particle 4 | 0.28 | 0.0022 | 5.9 |
| Toner particle 5 | 0.69 | 0.0022 | 5.7 |
| Toner particle 6 | 1.05 | 0.0027 | 6.5 |
| Toner particle 7 | 0.41 | 0.0028 | 6.3 |
| Toner particle 8 | 0.43 | 0.0027 | 6.2 |
| Toner particle 9 | 0.53 | 0.0035 | 6.3 |
| Toner particle 10 | 0.77 | 0.0032 | 6.0 |
| Toner particle 11 | 0.91 | 0.0120 | 5.8 |
| Toner particle 12 | 0.92 | 0.0007 | 5.9 |
| Toner particle 13 | 0.43 | 0.0150 | 6.5 |
| Toner particle 14 | 0.42 | 0.0006 | 6.2 |
| Toner particle 15 | 1.89 | 0.0022 | 6.3 |
| Toner particle 16 | 2.15 | 0.0022 | 6.3 |
| Toner particle 17 | 0.43 | 0.0200 | 5.9 |
| Toner particle 18 | 0.43 | 0.0006 | 5.7 |
| Toner particle 19 | 0.43 | 0.0220 | 6.0 |
| Toner particle 20 | 0.43 | 0.0003 | 6.2 |
| Toner particle 21 | 0.30 | 0.0020 | 6.2 |
| Toner particle 22 | 0.24 | 0.0024 | 6.0 |
| Toner particle 23 | 0.30 | 0.0018 | 6.0 |
| Toner particle 24 | 0.24 | 0.0025 | 6.2 |
| Toner particle 25 | 0.28 | 0.0022 | 5.9 |
| Toner particle 26 | 0.28 | 0.0023 | 6.0 |
| Toner particle 27 | 0.28 | 0.0022 | 6.0 |
| Toner particle 28 | 0.28 | 0.0023 | 5.8 |
| Toner particle 29 | 0.79 | 0.0024 | 7.2 |
| Toner particle 30 | 0.22 | 0.0023 | 6.3 |
| Toner particle 31 | 1.69 | 0.0023 | 6.1 |
| Toner particle 32 | 0.41 | 0.0024 | 6.1 |
| Toner particle 33 | 0.41 | 0.0022 | 5.8 |
| Toner particle 34 | 0.09 | 0.0023 | 6.5 |
| Toner particle 35 | 1.58 | 0.0023 | 6.2 |
| Toner particle 36 | 0.69 | 0.0042 | 6.1 |
| Toner particle 37 | 0.53 | 0.0025 | 6.3 |
| Toner particle 38 | 0.37 | 0.0024 | 6.4 |
| Toner particle 39 | 0.60 | 0.0027 | 6.2 |
| Toner particle 40 | 0.94 | 0.0025 | 6.5 |
| Toner particle 41 | 0.36 | 0.0010 | 5.9 |
| Toner particle 42 | 0.38 | 0.0050 | 6.0 |
| Toner particle 43 | 0.36 | 0.0008 | 6.4 |
| Toner particle 44 | 0.39 | 0.0100 | 6.2 |
| Toner particle 45 | 0.38 | 0.0024 | 5.8 |
| Toner particle 46 | 0.60 | 0.0025 | 6.1 |
| Comparative toner particle 1 | 0.96 | 0.0010 | 6.3 |
| Comparative toner particle 2 | — | 0.0001 | 5.9 |

TABLE 8-continued

|  | \| SPA − SPB \| [(J/m³)^0.5] | * | D4 [μm] |
|---|---|---|---|
| Comparative toner particle 3 | 1.02 | 0.0025 | 5.8 |
| Comparative toner particle 4 | — | 0.0024 | 6.2 |

*Ion count derived from silicon with mass number of 28 relative to total ion count at mass numbers 1 to 1,800 in TOF-SIMS measurement of toner particle surface.

Manufacturing Examples of Toners 1 to 46 and Comparative Toners 1 to 4

Using a Henschel mixer (Mitsui Miike), 0.6 parts of a hydrophobic silica particle with a BET value of 200 m²/g and a number-average particle size of 8 nm of the primary particles were mixed with 100.0 parts of each of the toner particles 1 to 46 and comparative toner particles 1 to 4. After being mixed, these were sieved with a 150 μm mesh to obtain the corresponding toners 1 to 46 and comparative toners 1 to 4.

Examples 1 to 46

Examples 1 to 46 were each evaluated using the corresponding toners 1 to 46. The evaluation methods and results are shown below.

Comparative Examples 1 to 4

Comparative Examples 1 to 4 were each evaluated using the corresponding comparative toners 1 to 4. The evaluations were the same as for the Examples 1 to 46.

Method for Evaluating Paper Discharge Adhesiveness

This was evaluated in a high-temperature, high-humidity environment (30° C./80% RH) using a modified LBP712Ci (Canon) as the laser printer. The modifications were as follows.

The gears and software of the evaluation apparatus were changed so that the process speed was 350 mm/sec and the fixing temperature was 180° C.

A cyan cartridge was used as the cartridge for evaluation. The commercial toner was removed from a commercial cyan cartridge, the interior of which was then cleaned by air blowing and filled with 50 g of the toner for evaluation. The commercial toner was also removed from the magenta, yellow and black stations, and replaced with magenta, yellow and black cartridges whose toner residue detection mechanisms had been deactivated.

Under these conditions, an image 25.0 cm long by 20.0 cm wide was printed in continuous double-sided mode with a toner laid-on level of 0.45 mg/cm² and evaluated as the stacked number of media sheets (Xerox 4200 paper, Xerox Co., 75 g/m²) was changed.

A predetermined number of sheets were printed and left for one minute in the output tray, and toner soiling of the bottommost sheet in the stack (first printed sheet) was evaluated according to the following standard. The evaluation results are shown in Table 9.

Evaluation Standard

A: No toner soiling of paper with 250 stacked sheets
B: Toner soiling occurred with 150 or more stacked sheets but fewer than 250 stacked sheets
C: Toner soiling occurred with 50 or more stacked sheets but fewer than 150 stacked sheets
D: Toner soiling occurred with fewer than 50 stacked sheets Method for Evaluating Low-Temperature Fixability A color laser printer (HP Color LaserJet 3525dn, HP Co.) was prepared with the fixing unit removed, and the toner was removed from the cyan cartridge and replaced with the toner for evaluation. An unfixed toner image (0.45 mg/cm²) 4.0 cm long and 10.0 cm wide was then formed on the media (GF-C081, 81.4 g/m²) with the new toner in a location 1.0 cm from the upper edge in the direction of paper feed.

Next, the removed fixing unit was modified so that the fixing temperature and process speed could be adjusted, and the process speed was set to 230 mm/s in a normal-temperature, normal-humidity environment (23° C., 60% RH). The unfixed image was then fixed with the fixing sleeve surface temperature varied from 100° C. to 180° C. in 5° C. increments.

A temperature 5° C. higher than the temperature at which "cold off" of the fixed image occurred was taken as the minimum fixing temperature, and the images were ranked according to the following standard. Low-temperature fixability is judged to be good if the rank is C or better. The results are shown in Table 9.

Evaluation Standard

A: Minimum fixing temperature not more than 115° C.
B: Minimum fixing temperature 120° C. or 125° C.
C: Minimum fixing temperature 130° C. or 135° C.
D: Minimum fixing temperature at least 140° C.

Method for Evaluating Heat-Resistant Storage Stability 5 g of each toner was taken in a 50-cc plastic cup, and left standing for 72 hours at 50° C./10% RH and 55° C./10% RH. The standing toner was evaluated by investigating the presence or absence of agglomerates. In these disclosures, a rank of C or better means that heat-resistant storage stability is good. The results are shown in Table 9.

Evaluation Standard

A: No agglomerates occurred
B: Slight agglomerates occurred, broken up by light finger pressure
C: Agglomerates occurred, not broken up by light finger pressure
D: Completely aggregated Image Evaluation in Low-Temperature, Low-Humidity Environment Fogging of non-image parts was evaluated as an indicator of image quality.

This fogging was evaluated in a low-temperature, low-humidity environment (15° C./10% RH). Xerox 4200 paper (Xerox Co., 75 g/m²) was used as the evaluation paper. The evaluation apparatus and toner cartridge were similar to those used to evaluate paper discharge adhesiveness. A solid white image was output and given Ds as the worst reflection density of the white background and Dr (%) as the average reflection density of the transfer material before image formation, "Dr-Ds (%)" was taken as the fogging value.

The reflection density of the white background was measured using a reflection densitometer (Reflectometer model TC-6DS, Tokyo Denshoku) with an amber light filter. The smaller the value, the better the evaluation. The evaluation standard is as follow. The evaluation results are shown in Table 9.

Evaluation Standard

A: Less than 0.50%
B: 0.50% to less than 1.50%
C: 1.50% to less than 3.00%
D: At least 3.00%

TABLE 9

| | | Evaluation item | | | | | | |
|---|---|---|---|---|---|---|---|---|
| | | Paper | Low-temperature fixability evaluation | | Heat-resistant storage stability evaluation | | Charging performance evaluation | |
| | | discharge adhesiveness | | Minimum fixing | | | | |
| Example | Toner | evaluation Rank | Rank | temperature (° C.) | 50° C. Rank | 55° C. Rank | Rank | Fogging (%) |
| Example 1 | Toner 1 | A | A | 110 | A | A | A | 0.45 |
| Example 2 | Toner 2 | A | A | 110 | A | A | A | 0.45 |
| Example 3 | Toner 3 | A | A | 115 | A | A | A | 0.10 |
| Example 4 | Toner 4 | A | A | 115 | A | A | A | 0.10 |
| Example 5 | Toner 5 | A | A | 110 | A | A | A | 0.46 |
| Example 6 | Toner 6 | B | B | 120 | B | B | A | 0.46 |
| Example 7 | Toner 7 | A | A | 110 | A | B | A | 0.46 |
| Example 8 | Toner 8 | A | A | 110 | A | B | A | 0.46 |
| Example 9 | Toner 9 | B | A | 110 | A | A | C | 1.70 |
| Example 10 | Toner 10 | B | A | 110 | A | A | C | 1.70 |
| Example 11 | Toner 11 | B | A | 110 | A | A | B | 0.70 |
| Example 12 | Toner 12 | B | A | 110 | A | A | B | 0.70 |
| Example 13 | Toner 13 | C | A | 110 | A | A | B | 0.90 |
| Example 14 | Toner 14 | C | A | 110 | A | A | B | 0.70 |
| Example 15 | Toner 15 | B | A | 115 | A | A | A | 0.48 |
| Example 16 | Toner 16 | C | A | 115 | A | A | A | 0.48 |
| Example 17 | Toner 17 | A | A | 110 | B | B | C | 1.60 |
| Example 18 | Toner 18 | B | A | 110 | A | A | A | 0.47 |
| Example 19 | Toner 19 | A | A | 110 | B | C | C | 2.20 |
| Example 20 | Toner 20 | C | A | 110 | A | A | A | 0.48 |
| Example 21 | Toner 21 | B | A | 110 | A | A | A | 0.48 |
| Example 22 | Toner 22 | A | A | 110 | A | B | A | 0.45 |
| Example 23 | Toner 23 | C | A | 110 | A | A | A | 0.45 |
| Example 24 | Toner 24 | A | A | 110 | B | B | A | 0.45 |
| Example 25 | Toner 25 | A | B | 125 | A | A | A | 0.12 |
| Example 26 | Toner 26 | A | A | 115 | A | B | A | 0.15 |
| Example 27 | Toner 27 | A | C | 130 | A | A | A | 0.13 |
| Example 28 | Toner 28 | A | A | 115 | B | B | A | 0.17 |
| Example 29 | Toner 29 | A | A | 110 | A | A | B | 1.00 |
| Example 30 | Toner 30 | A | B | 125 | A | A | A | 0.45 |
| Example 31 | Toner 31 | A | C | 130 | A | A | A | 0.38 |
| Example 32 | Toner 32 | A | A | 110 | A | B | A | 0.46 |
| Example 33 | Toner 33 | A | A | 115 | A | B | A | 0.46 |
| Example 34 | Toner 34 | A | B | 120 | A | A | A | 0.10 |
| Example 35 | Toner 35 | A | A | 110 | A | A | C | 1.60 |
| Example 36 | Toner 36 | A | A | 110 | A | A | A | 0.45 |
| Example 37 | Toner 37 | A | A | 115 | A | B | A | 0.45 |
| Example 38 | Toner 38 | B | A | 115 | A | B | B | 1.45 |
| Example 39 | Toner 39 | A | A | 115 | A | B | A | 0.10 |
| Example 40 | Toner 40 | A | A | 115 | A | B | B | 1.20 |
| Example 41 | Toner 41 | B | A | 115 | A | B | A | 0.45 |
| Example 42 | Toner 42 | A | A | 115 | A | B | B | 0.70 |
| Example 43 | Toner 43 | C | A | 115 | A | B | A | 0.45 |
| Example 44 | Toner 44 | A | A | 115 | A | B | C | 1.70 |
| Example 45 | Toner 45 | A | A | 110 | A | B | A | 0.45 |
| Example 46 | Toner 46 | A | A | 110 | B | B | A | 0.20 |
| Comparative Example 1 | Comparative toner 1 | D | A | 110 | B | B | D | 3.40 |
| Comparative Example 2 | Comparative toner 2 | D | A | 110 | B | B | C | 2.40 |
| Comparative Example 3 | Comparative toner 3 | B | D | 140 | B | D | B | 1.40 |
| Comparative Example 4 | Comparative toner 4 | B | D | 150 | A | A | B | 0.90 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-178405, filed Oct. 23, 2020, which is hereby incorporated by reference herein in its entirety.

What is claimed is:

1. A toner, comprising:
a toner particle comprising a resin A represented by formula (1), and a resin B comprising a monomer unit represented by formula (2)

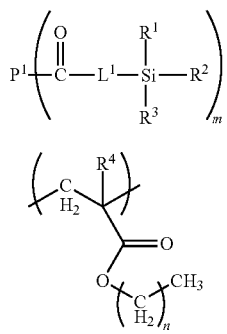

where $P^1$ represents a polymer segment,
$R^1$ to $R^3$ independently represent a hydrogen atom, an alkyl group having 1 or more carbon atoms, a hydroxy group or an alkoxy group having 1 or more carbon atoms, with the proviso that at least one of $R^1$ to $R^3$ is a hydroxy group or an alkoxy group having 1 or more carbon atoms,
m represents a positive integer,
$L^1$ is an alkylene group having not more than 8 carbon atoms, *—O—**, *—$OR^5$—**, *—NH—** or *—$NHR^6$—**, in which * represents a bonding moiety with a carbonyl group in formula (1), ** represents a bonding moiety with a silicon atom, $R^5$ and $R^6$ independently represent an alkylene group having not more than 8 carbon atoms, and each carbon may optionally have a hydroxy group as a substituent,
when m is 2 or more, the multiple $L^1$s, multiple $R^1$s, multiple $R^2$s and multiple $R^3$s may each be the same or different,
$R^4$ represents a hydrogen atom or methyl group, and
n is an integer from 11 to 35.

2. The toner according to claim 1, wherein resin B comprises a monomer unit represented by formula (3)

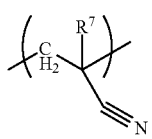

where $R^7$ represents a hydrogen atom or methyl group.

3. The toner according to claim 1, wherein $L^1$ is *—$NHR^6$**.

4. The toner according to claim 1, wherein $L^1$ is *—$OR^5$—**.

5. The toner according to claim 1, wherein resin A comprises 0.5 to 10.0 mass % of a structure represented by formula (4)

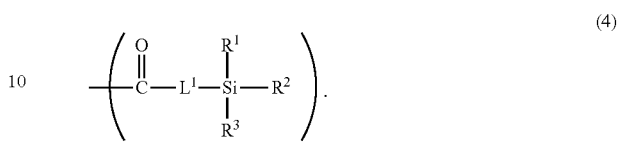

6. The toner according to claim 1, wherein |SPA—SPB|≤2.00 when SPA $[(J/m^3)^{0.5}]$ is a SP value of resin A by the Fedors method and SPB $[(J/m^3)^{0.5}]$ is a SP value of resin B by the Fedors method.

7. The toner according to claim 1, wherein 0.0050≤MA/MB≤0.2000 when MA (mass %) is a content of resin A in the toner particle and MB (mass %) is a content of resin B in the toner particle.

8. The toner according to claim 1, wherein MwA is from 8,000 to 50,000 where MwA is a weight-average molecular weight of resin A.

9. The toner according to claim 1, wherein MwB is from 15,000 to 250,000 where MwB is a weight-average molecular weight of resin B.

10. The toner according to claim 1, wherein n is from 17 to 29.

11. The toner according to claim 1, wherein the resin A further comprises a monomer unit represented by formula (3)

where $R^7$ represents a hydrogen atom or methyl group.

12. The toner according to claim 1, wherein $P^1$ represents a polyester resin segment.

13. The toner according to claim 1, wherein $P^1$ represents a vinyl resin segment.

14. The toner according to claim 1, wherein an ion count derived from silicon with a mass number of 28 relative to a total ion count at mass numbers 1 to 1,800 is 0.0010 to 0.0050 by measuring a toner particle surface using time-of-flight secondary ion mass spectrometry.

15. The toner according to claim 1, wherein resin A comprises at least one monomer unit selected from the group consisting of formulae (7) to (10)

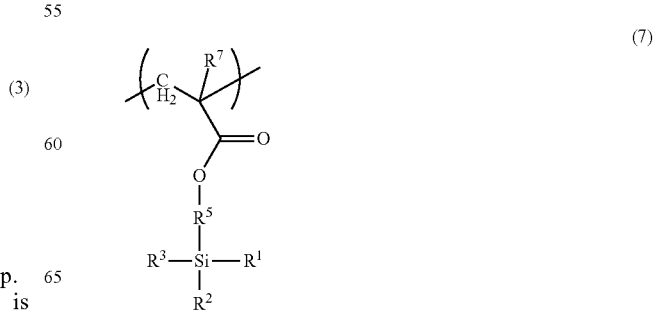

-continued

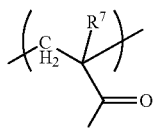
(8)

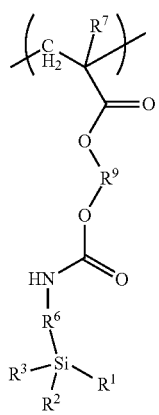
(9)

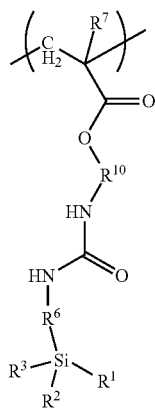
(10)

where R⁷ represents a hydrogen atom or methyl group, and R⁹ and R¹⁰ independently represent $C_{1-6}$ alkylene groups.

16. The toner according to claim 1, wherein formula (1) is at least one structure selected from the group consisting of formulae (11) and (12)

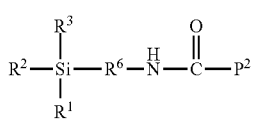
(11)

-continued

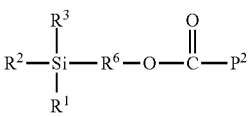
(12)

where P² represents a main chain skeleton of a polyester resin.

17. A method for manufacturing the toner according to claim 1, comprising the steps of:
dispersing a toner base particle comprising resin B in an aqueous medium to obtain a toner slurry; and
adding to the toner slurry a radical polymerization initiator and a monomer composition comprising a monomer represented by formula (6)

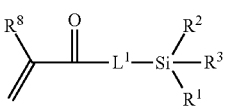
(6)

where R⁸ represents a hydrogen atom or methyl group; and
forming the resin A on a surface of the toner base particle.

18. The toner according to claim 1, wherein resin B comprises a monomer unit represented by formula (3)

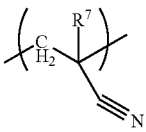
(3)

where R⁷ represents a hydrogen atom or methyl group, and
an ion count derived from silicon with a mass number of 28 relative to a total ion count at mass numbers 1 to 1,800 is 0.0010 to 0.0050 by measuring a toner particle surface using time-of-flight secondary ion mass spectrometry.

19. The toner according to claim 1, wherein 0.0050≤MA/MB≤ 0.2000 when MA (mass %) is a content of resin A in the toner particle and MB (mass %) is a content of resin B in the toner particle, and
an ion count derived from silicon with a mass number of 28 relative to a total ion count at mass numbers 1 to 1,800 is 0.0010 to 0.0050 by measuring a toner particle surface using time-of-flight secondary ion mass spectrometry.

20. The toner according to claim 1, wherein n is from 27 to 29, and
an ion count derived from silicon with a mass number of 28 relative to a total ion count at mass numbers 1 to 1,800 is 0.0010 to 0.0050 by measuring a toner particle surface using time-of-flight secondary ion mass spectrometry.

* * * * *